(12) United States Patent
Maloo et al.

(10) Patent No.: US 10,817,172 B2
(45) Date of Patent: Oct. 27, 2020

(54) TECHNOLOGIES FOR GRAPHICAL USER INTERFACE MANIPULATIONS USING MULTI-FINGER TOUCH INTERACTIONS

(71) Applicant: Intel Corporation, Santa Clara, CA (US)

(72) Inventors: Raghvendra Maloo, Bangalore (IN); John J. Valavi, Hillsboro, OR (US); Chih-Fan Hsin, Portland, OR (US); Gokul V. Subramaniam, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 914 days.

(21) Appl. No.: 14/671,726

(22) Filed: Mar. 27, 2015

(65) Prior Publication Data

US 2016/0283105 A1    Sep. 29, 2016

(51) Int. Cl.
*G06F 3/0488* (2013.01)

(52) U.S. Cl.
CPC ...... *G06F 3/04886* (2013.01); *G06F 3/04883* (2013.01); *G06F 2203/04808* (2013.01)

(58) Field of Classification Search
CPC ............. G06F 3/04886; G06F 3/04883; G06F 2203/04808
See application file for complete search history.

(56) References Cited

U.S. PATENT DOCUMENTS

| | | |
|---|---|---|
| 7,978,182 B2 | 7/2011 | Ording |
| 8,269,729 B2 | 9/2012 | Han |
| 2005/0125740 A1* | 6/2005 | Clow .................... G06F 3/0481 715/794 |
| 2008/0180404 A1* | 7/2008 | Han ..................... G06F 3/04883 345/173 |
| 2009/0183098 A1* | 7/2009 | Casparian ............. G06F 3/0238 715/765 |
| 2010/0079493 A1 | 4/2010 | Tse |
| 2011/0102333 A1* | 5/2011 | Westerman ......... G06F 3/04883 345/173 |

(Continued)

OTHER PUBLICATIONS

Scratchpixel v2.0, Geometry—Math Operations on Points and Vectors, scratchpixel.com, https://web.archive.org/web/20150218192911/http://www.scratchapixel.com/lessons/mathematics-physics-for-computer-graphics/geometry/math-operations-on-points-and-vectors, pp. 1-9 (Year: 2015).*

(Continued)

*Primary Examiner* — Daniel W Parcher
(74) *Attorney, Agent, or Firm* — Barnes & Thornburg LLP

(57) ABSTRACT

Technologies for manipulating a graphical user interface (GUI) of a display of a computing device include a touch screen of the display capable of receiving user input via physical contact of the user's fingers. The computing device determines whether the user has initiated multi-finger input gesture from which and a hand rotation angle may be determined based on touch points corresponding to the physical contact between the user's fingers and the touch screen. Based on the hand rotation angle, the computing device may take an action on the GUI, such as rotate an orientation of the GUI and/or display a virtual keyboard on the GUI relative to the hand rotation angle and/or the touch points. Other embodiments are described herein and claimed.

16 Claims, 17 Drawing Sheets

(56) References Cited

U.S. PATENT DOCUMENTS

| | | | |
|---|---|---|---|
| 2011/0221667 A1* | 9/2011 | Lee | G01B 7/30 345/156 |
| 2012/0154313 A1* | 6/2012 | Au | G06F 3/04883 345/173 |
| 2013/0127825 A1 | 5/2013 | Joshi | |
| 2013/0207920 A1 | 8/2013 | McCann | |
| 2015/0186037 A1* | 7/2015 | Kanatani | G06F 3/0488 715/773 |
| 2015/0338991 A1* | 11/2015 | Westerman | G06F 3/044 345/178 |
| 2016/0054861 A1* | 2/2016 | Shan | G06F 3/0481 715/750 |
| 2016/0274768 A1* | 9/2016 | Tian | G06F 3/04845 |

OTHER PUBLICATIONS

International Search Report for PCT/US16/019779, dated Jul. 11, 2016 (7 pages).

Written Opinion for PCT/US16/019779, dated Jul. 11, 2016 (9 pages).

\* cited by examiner

1300

| APPLICATION 1302 | DEFAULT SOFT KEYS 1304 |
|---|---|
| VIDEO CHAT | FULL SCREEN TOGGLE<br>VOLUME CONTROL<br>BACKGROUND SEGMENTATION<br>INITIATE CALL<br>DROP CALL<br>ADD FRIENDS |
| INTERNET BROWSER | FAVORITES<br>BOOKMARK<br>NAVIGATION CONTROL<br>SCROLL UP/DOWN<br>SEARCH<br>NEW TAB |
| VIDEO PLAYBACK | FULL SCREEN TOGGLE<br>VOLUME CONTROL<br>BRIGHTNESS CONTROL<br>PLAY/PAUSE TOGGLE<br>ADJUST VIDEO QUALITY |
| DOCUMENT READER | FULL SCREEN TOGGLE<br>NEXT SLIDE<br>PREVIOUS SLIDE<br>GO TO SLIDE<br>SEARCH<br>PROJECT |
| PRESENTATION VIEWER | FULL SCREEN TOGGLE<br>NEXT SLIDE<br>PREVIOUS SLIDE<br>GO TO SLIDE<br>SEARCH<br>PROJECT |
| IMAGE VIEWER | NEXT PHOTO<br>PREVIOUS PHOTO<br>CHANGE ORIENTATION<br>SHARE<br>SLIDESHOW |

TECHNOLOGIES FOR GRAPHICAL USER INTERFACE MANIPULATIONS USING MULTI-FINGER TOUCH INTERACTIONS

BACKGROUND

Computing devices typically include various methods for supporting user interaction (i.e., receiving input from a user). For example, a computing device may support receiving user input via an input device, such as a mouse, touchpad, and/or a keyboard. Modern computing devices, such as smartphones, tablets, and all-in-one computing devices, are additionally or alternatively, capable of receiving user input via an electronic display (i.e., a touchscreen display) using various technologies, such as resistive, surface acoustic wave, and capacitive to support input via touch. As a result, a user can control the computing device by touching the touchscreen display using one or more fingers (e.g., a single finger touch, multi-finger touch, etc.). Touchscreen displays allow users to interact directly with a graphical user interface (GUI) displayed on the touchscreen displays through various touch-based input gestures (e.g., flicks, pinches, press-and-holds, press and taps, swipes, etc.). To facilitate the user interaction, certain GUI elements (e.g., graphical icons, visual indicators, virtual soft keys, etc.) may be displayed (i.e., rendered) on the touchscreen display. Such GUI elements allow the user to directly interact with applications running on the computing device.

Further, as modern computing devices have become smaller, mobile, and capable of being handheld during operation, the orientation of the GUI (e.g., soft keys, application frames, etc.) on the computing device displays can become skewed as the user rotates the computing device (i.e., the display). Traditional computing devices, or displays thereof, typically only allowed the user to change the orientation of the GUI display between landscape and portrait modes through a manual process, such as via an orientation setting of the display. However, enhancements in microelectromechanical devices have led to a number of computing devices being outfitted with various components, such as accelerometers, which may allow certain computing devices to automatically change the GUI display orientation when the user rotates the computing device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 13 is a simplified mapping table of illustrative applications that may be associated with default soft keys of the context-specific virtual keyboard of FIG. 12.

DETAILED DESCRIPTION OF THE DRAWINGS

Figure 1:
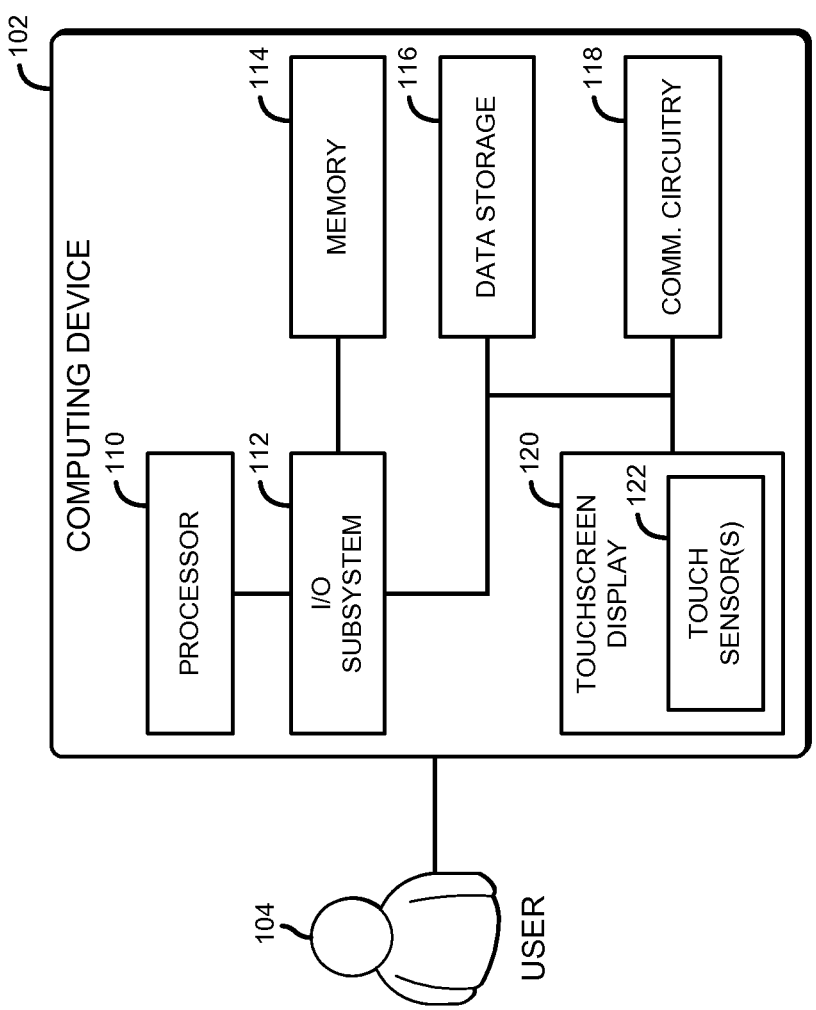
FIG. 1 is a simplified block diagram of at least one embodiment of a system for manipulating a graphical user interface (GUI) of a computing device using multi-finger touch interactions on a display of the computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C).

Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for manipulating a graphical user interface (GUI) of a display using multi-finger touch interactions includes a computing device 102 with a display 120 that supports receiving input from a user 104 via a touch screen 122. As will be described in further detail, the display 120 includes the touch screen 122 for receiving contact from the user 104, such as via a fingertip of the user 104. Accordingly, touch points corresponding to those contacts may be used to control the computing device 102 and software applications running thereon based on user interactions with the touch screen 122. To do so, the display 120 is capable of displaying GUI elements (e.g., graphical icons, visual indicators, virtual soft keys, etc.) corresponding to software applications running on the computing device 102, which allow the user 104 to interact with the software applications. The user interactions are typically performed via direct manipulation of the GUI elements.

Additionally, certain software applications may interpret certain user interactions, such as motions made with one or more fingers on the display 120, commonly referred to as input gestures. Typically, the GUI elements are rendered on the display 120, whereby the user can interact with the GUI elements via the input gestures. However, certain input gestures may not be specific to a particular GUI element (e.g., where no actionable GUI element is displayed to the user), but rather to a particular software application. The input gestures may include various flicks, pinches, press-and-holds, press and taps, swipes, and any other number of input gestures. Generally, supported input gestures are mapped to predefined functionality of the particular software application that is responsible for taking an action based on the detected input gestures. In other words, input gestures may cause a software application running on the computing device 102 to execute a particular predefined action based on the detection of the input gesture. For example, a pinch gesture may zoom in on an image or a swipe gesture in a particular direction may navigate backward/forward through a gallery of images.

Some input gestures, such as the pinch gesture, require multi-finger touch interactions. Other multi-finger touch interactions may include a five-finger contact gesture, in which each of the five fingers (i.e., four fingers and a thumb) of one of the user's 104 hands makes and maintains contact with the touch screen 122 for a duration that exceeds a predetermined duration (i.e., a five-finger press-and-hold). Upon detecting the five-finger press-and-hold contact gesture, the computing device 102 may determine an angle at which the hand of the user 104 is interfacing with the computing device 102, based on the contact points, or touch points, of the fingers of the five-finger press-and-hold contact gesture.

As discussed in more detail below, in some embodiments, the computing device 102 may perform certain actions upon determining the hand angle of the user 104. For example, the GUI is typically displayed in either a landscape orientation or a portrait orientation relative to the display 120. In some embodiments, when the five-finger press-and-hold contact gesture is detected, the angle at which the hand of the user is interfacing with the computing device 102 may be used to adjust the GUI orientation of the display 120 based on the angle at which the user's 104 hand is interfacing with the computing device 102. Additionally or alternatively, in some embodiments, the computing device 102 may display a virtual keyboard that may be comprised of a number of soft keys for receiving user input and performing a particular task based on the touched soft key or input gesture received. Further, the virtual keyboard may be displayed at a size, location, and/or angle on the display 120 relative to the contact points of the five-finger press-and-hold contact gesture, such that the virtual keyboard is ergonomically shaped and/or located based on the angle at which the user's 104 hand is interfacing with the computing device 102.

The computing device 102 may be embodied as any type of computing device capable of performing the functions described herein. For example, the computing device 102 may be embodied as, without limitation, a laptop computer, a notebook computer, a tablet computer, a smartphone, a wearable computing device, a computer, a workstation, a server, a multiprocessor system, a consumer electronic device, a digital television device, a smart appliance, an all-in-one computing device, and/or any other computing device configured to support user input via touch. As shown in FIG. 1, the illustrative computing device 102 includes a processor 110, an input/output (I/O) subsystem 112, a memory 114, a data storage device 116, communication circuitry 118, and the display 120. Of course, the computing device 102 may include other or additional components, such as those commonly found in a computing device (e.g., a graphics processing unit), in other embodiments. Additionally, in some embodiments, one or more of the illustrative components may be incorporated in, or otherwise form a portion of, another component. For example, the memory 114, or portions thereof, may be incorporated in one or more processors 110 in some embodiments.

The processor 110 may be embodied as any type of processor capable of performing the functions described herein. The processor 110 may be embodied as a single or multi-core processor(s), digital signal processor, microcontroller, or other processor or processing/controlling circuit. The memory 114 may be embodied as any type of volatile or non-volatile memory or data storage capable of performing the functions described herein. In operation, the memory 114 may store various data and software used during operation of the computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 102. For example, the I/O subsystem 112 may be embodied as, or otherwise include, memory controller hubs, input/output control hubs, integrated sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processors 110, the memory 114, and other components of the computing device 102, on a single integrated circuit chip.

The data storage device 116 may be embodied as any type of device or devices configured for short-term or long-term storage of data such as, for example, memory devices and circuits, memory cards, hard disk drives, solid-state drives, or other data storage devices. The communication circuitry 118 of the computing device 102 may be embodied as any communication circuit, device, or collection thereof, capable of enabling network communications to and from the computing device 102 via a network. The communication circuitry 118 may be configured to use one or more communication technologies to support wired and/or wireless communications, and associated protocols (e.g., Ethernet, Bluetooth®, Wi-Fi®, WiMAX, etc.) to effect such communication.

The display 120 may be embodied as any type of display device configured to display digital information, such as a liquid crystal display (LCD), a light emitting diode (LED), a plasma display, a cathode ray tube (CRT), or other type of display device. The touch screen 122 may be embodied as any type of touch screen capable of generating input data in response to being touched by the user 104 of the computing device 102. The touch screen 122 may be embodied as a resistive touch screen, a capacitive touch screen, a camera-based touch screen, or the like. In some embodiments, the touch screen 122 may be comprised of a touch screen sensor responsive to multiple simultaneous touch points and a controller-based firmware to interpret the input gestures resulting from the touch points and interface with various applications capable of being executed on the computing device 102, such as via an application program interface (API).

Figure 2:
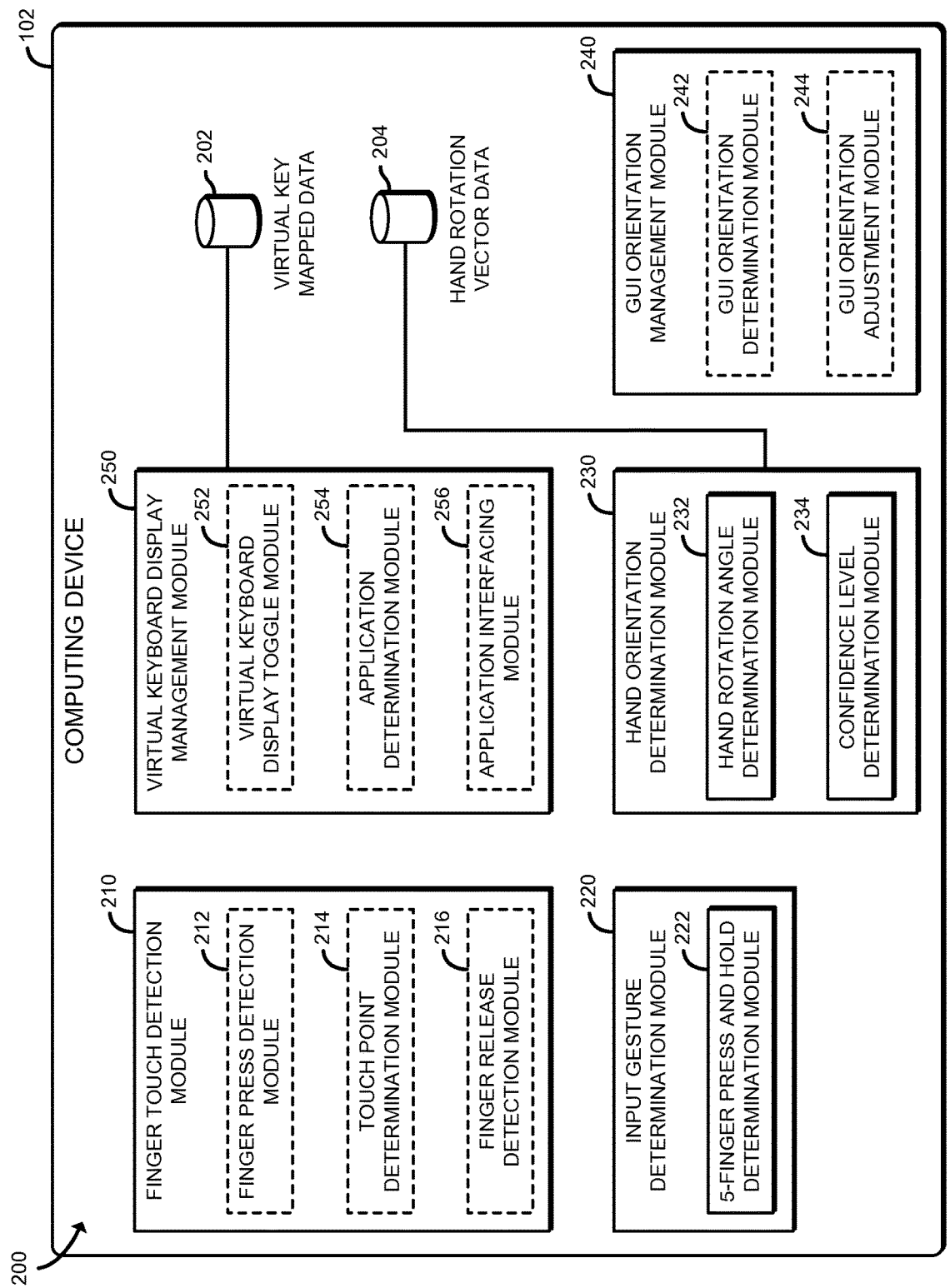
FIG. 2 is a simplified block diagram of at least one embodiment of an environment that may be established by the computing device of FIG. 1.

Referring now to FIG. 2, in an embodiment, the computing device 102 establishes an environment 200 during operation. The illustrative environment 200 includes a finger touch detection module 210, an input gesture determination module 220, a hand orientation determination module 230, a GUI orientation management module 240, and a virtual keyboard display management module 250. Each of the modules, logic, and other components of the environment 200 may be embodied as hardware, software, firmware, or a combination thereof. For example, each of the modules, logic, and other components of the environment 200 may form a portion of, or otherwise be established by, a processor or other hardware components of the computing device 102. As such, in some embodiments, one or more of the modules of the environment 200 may be embodied as a circuit or collection of electrical devices (e.g., finger touch detection circuit, an input gesture determination circuit, etc.). In the illustrative environment 200, the computing device 102 includes virtual key mapped data 202 and hand rotation vector data 204, each of which may be accessed by the various modules of the computing device 102. It should be appreciated that the computing device 102 may include other components, sub-components, modules, and devices commonly found in a computing device, which are not illustrated in FIG. 2 for clarity of the description.

The finger touch detection module 210 is configured to receive contact data from the touch screen 122 and determine a touch point for each contact with the touch screen 122 based on the received contact data. For example, the finger touch detection module 210 may detect that one or more fingers (i.e., touch points) are in contact with the touch screen 122 and determine a central point of contact (i.e., a centroid of the touch point) for each finger. In some embodiments, one of more functions performed by the finger touch detection module 210 may be performed by sub-modules, for example, by a finger press detection module 212, a touch point determination module 214, and a finger release detection module 216. In such embodiments, the finger press detection module 212 may be configured to detect a presence of the user's 104 finger(s) on the touch screen 122. Additionally or alternatively, in such embodiments, the touch point determination module 214 may be configured to determine touch points and the centroid of the touch points based on the detected presence of the user's 104 fingers on the touch screen. The finger release detection module 216, in such embodiments, may be configured to detect when the presence of the user's 104 finger(s) on the touch screen 122 are released.

The input gesture determination module 220 is configured to determine whether an input gesture is being performed by the user 104 based on the one or more touch points. In other words, the input gesture determination module 220 may monitor the touch point(s) to determine whether the user 104 has input an input gesture. To do so, the input gesture determination module 220 may track the touch point(s) over time to determine whether the user 104 has performed an input gesture. For example, in determining a press-and-hold gesture, the input gesture determination module 220 may determine whether the touch point(s) have remained in contact with the touch screen 122 for at least a predetermined period of time sufficient to indicate an intention of the user 104 to perform the press-and-hold input gesture.

The input gesture determination module 220 may contain various sub-modules for determining the input gestures. One such input gesture determining submodule includes a five-finger press-and-hold determination module 222. The five-finger press-and-hold determination module 222 is configured to determine whether five touch points, corresponding to five finger contacts, have remained in contact with the touch screen 122 for a predetermined period of time (i.e., a five-finger press-and-hold gesture). In some embodiments, the five-finger press-and-hold determination module 222 may be further configured to determine whether the five finger touch points correspond to five fingers of a single hand of the user 104. To do so, in some embodiments, the five-finger press-and-hold determination module 222 may determine whether four of the five touch points closest to each other can be fitted into a concave curve as discussed in more detail below. It should be appreciated that, in some embodiments, the input gesture determination module 220 may receive touch point data from the finger touch detection module 210.

The hand orientation determination module 230 is configured to determine a hand orientation based on the one or more touch points. To do so, the hand orientation determination module 230 includes a hand rotation angle determination module 232 and a confidence level determination module 234. The hand rotation angle determination module 232 is configured to determine a hand rotation angle based on the one or more touch points. To determine the hand rotation angle, the hand rotation angle determination module 232 determines a centroid and a centroidal axes (i.e., an x-axis and a y-axis) through the centroid based on each of the one or more touch points and a touch point vector for each touch point to the centroid position, and performs a summation of the determined touch point vectors to determine a rotation vector. The hand rotation angle determination module 232 may be further configured to determine the hand rotation angle based on an angle of the rotation vector from a positive x-axis through the centroid.

In some embodiments, the hand rotation angle determination module 232 may be further configured to determine a touch point that corresponds to a thumb position and apply a weight to the thumb position. To do so, in some embodiments, the hand rotation angle determination module 232 may determine the touch point vector having the furthest distance from the centroid position. In such embodiments, the hand rotation angle determination module 232 may apply the weight may be applied to the touch point position that is determined by the hand rotation angle determination module 232 to correspond to a thumb and add the weight to the rotation vector. It should be appreciated that, in some embodiments, the hand orientation determination module 230 may determine the hand orientation in response to an input gesture, such as the five-finger press-and-hold gesture, being determined. In such embodiments, the hand orientation determination module 230 may receive the determined input gesture from the input gesture determination module 220.

The confidence level determination module 234 is configured to determine a confidence level of the determined hand rotation angle. To do so, the confidence level determination module 234 may determine which three touch point vectors, of the five touch point vectors, have the shortest distance to the centroid. The confidence level determination module 234 may additionally calculate an angle to the determined rotation vector for each of the three shortest touch point vectors. As will be further described below, the confidence level determination module 234 may determine the confidence level of the hand orientation angle based on whether each of the angles is determined to be less than a maximum angle (e.g., 90°).

In some embodiments, historical hand orientation angles and corresponding confidence levels may be stored, such as in the hand rotation vector data 204, for the hand rotation angle determination module 232 and/or the confidence level determination module 234 to perform heuristics on the determined hand rotation angle and/or the confidence level of the determined hand rotation angle to adjust the weight, the maximum angle, and/or the confidence level threshold over time. It should be appreciated that while the five-finger press-and-hold input gesture may be used to determine the hand orientation, it is contemplated that any multi-finger input gesture in which the hand orientation may be determined may be used by the hand orientation determination module 230 to determine the hand orientation based on the multiple touch points.

The GUI orientation management module 240 is configured to manage the orientation of the GUI on the display 120. To do so, the GUI orientation management module may determine a present orientation of the GUI on the display 120 and a difference between the present orientation of the GUI and the hand orientation angle. The GUI orientation management module 240 may be further configured to determine a GUI orientation rotation angle based on the difference between the present orientation of the GUI and the hand orientation angle. In other words, the GUI orientation management module 240 may be configured to rotate the present orientation of the GUI on the display 120 to a desired GUI orientation based on the hand orientation angle. Accordingly, the GUI orientation management module 240 may be further configured to provide an indication to the display 120, or a component (e.g., the processor 110, a graphics processing unit, a display driver, etc.) of the computing device 102 that controls the GUI orientation on the display 120, to rotate the GUI orientation based on the desired GUI orientation. In some embodiments, one of more functions performed by the GUI orientation management module 240 may be performed by sub-modules, such as a GUI orientation determination module 242 and a GUI orientation adjustment module 244, for example.

The virtual keyboard display management module 250 is configured to manage the display of a virtual keyboard on the GUI of the display 120. To do so, the virtual keyboard display management module 250 is configured to display the virtual keyboard at a position on the GUI based on the hand rotation angle and/or the touch points. For example, a virtual keyboard may be displayed on the GUI at an angle corresponding to the hand orientation angle and at a position, size, and/or shape corresponding to the touch points. The virtual keyboard display management module 250 is additionally configured to provide an interface between virtual keys of virtual keyboard and the application interfacing commands mapped to the virtual keys. In some embodiments, a default set of keys may be mapped to corresponding default actions. In such embodiments, a mapping table may be stored in the virtual key mapped data 202.

In some embodiments, the virtual keyboard display management module 250 may be configured to display a virtual keyboard that is context sensitive to an application or an active process running on the computing device 102. In other words, the contents (e.g., soft keys, visual indicators, and/or the like) of the virtual keyboard may correspond to an application or process presently being executed on the computing device 102 at the time of the touch point detection (e.g., the five-finger input gesture). The application may be identified by any means to identify the application for intended use of the virtual keyboard, such as a z-order of the presently running applications (i.e., a top-most application), an application directly underlying the touch points, a type of media underlying the touch points, etc.

Figure 12:
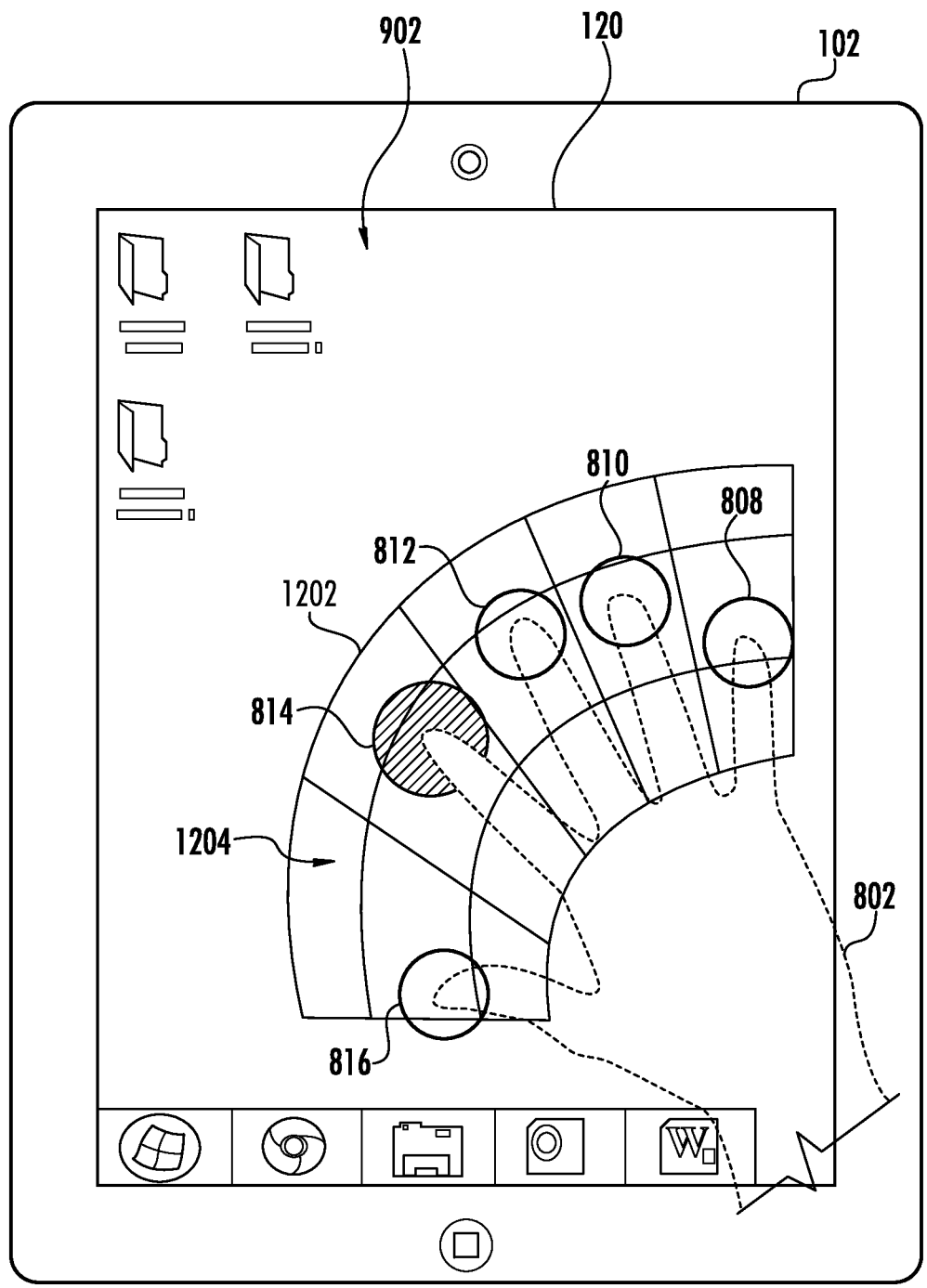
FIG. 12 is a simplified illustration of another context-specific virtual keyboard on a display of the computing device of FIG. 2 having active finger contacts being displayed during a multi-finger touch interaction.

In embodiments wherein the virtual keyboard is context sensitive, the virtual keyboard display management module 250 may communication with the application, such as via an API, to determine the soft keys, visual indicators, graphical icons, etc. to display. An example of which is shown in FIGS. 12 and 13, which will described in further detail. In some embodiments, one of more functions performed by the virtual keyboard display management module 250 may be performed by one or more sub-modules, such as a virtual keyboard display toggle module 252, an application determination module 254, and an application interfacing module 256, for example.

Figure 3:
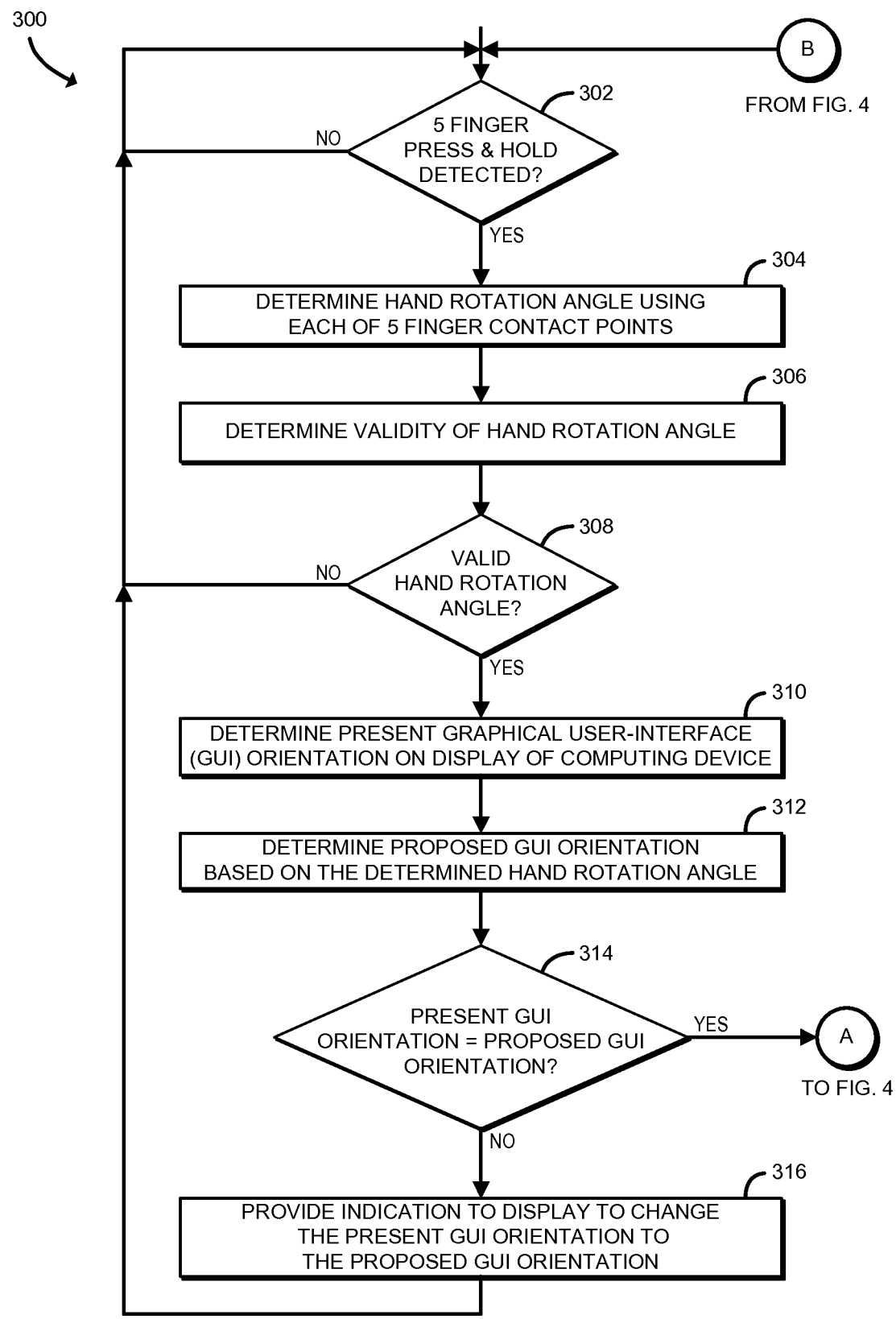
FIG. 3 is a simplified flow diagram of at least one embodiment of a method for changing a GUI orientation of a display of the computing device of FIG. 2 during a multi-finger touch interaction that may be executed by the computing device of FIG. 2.

Referring now to FIG. 3, in use, the computing device 102 may execute a method 300 for changing a GUI orientation of the display 120. The illustrative method 300 begins at block 302, in which the computing device 102 determines whether a five-finger-press-and-hold input gesture was detected. In other words, the computing device 102 determines whether five finger contact points, or touch points, have been detected by the display 120 (i.e., by the touch screen 122 of the display 120) for a predetermined period of time, thereby indicating an intentional press and hold input gesture. If the five-finger-press-and-hold input gesture was not detected, the method 300 loops back to block 302 to continue determining whether the five-finger-press-and-hold input gesture was detected.

Figure 5:
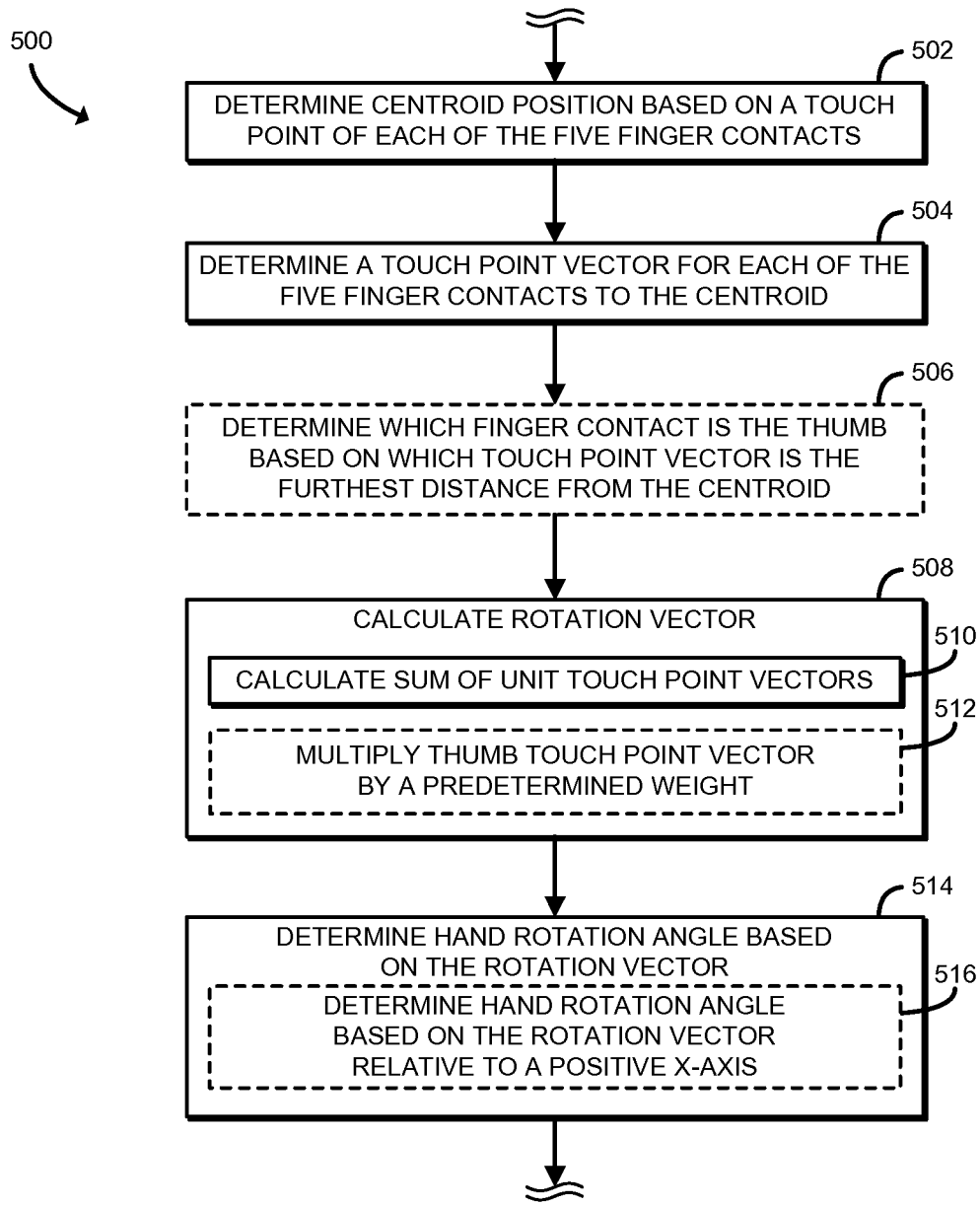
FIG. 5 is a simplified flow diagram of at least one embodiment of a method for determining a hand rotation angle during a multi-finger touch interaction that may be executed by the computing device of FIG. 2.

If the five-finger-press-and-hold input gesture was detected, the method 300 advances to block 304. At block 304, the computing device 102 determines a hand rotation angle using each of the five finger contact points of the five-finger-press-and-hold input gesture. An example of which is shown in FIG. 5, which is discussed further below. At block 306, the computing device 102 determines a validity of the hand rotation angle (i.e., a hand rotation angle validity check) determined at block 304. In other words, the computing device 102 determines whether it has confidence in the determined hand rotation angle (see, e.g., method 600 of FIG. 6). At block 308, the computing device 102 determines whether the hand rotation angle is valid based on the validity of the hand rotation angle determined at block 306. If the hand rotation angle is determined to not be valid (i.e., the computing device 102 has determined it does not enough confidence in the determined hand rotation angle to proceed), the method 300 loops back to block 302, wherein the computing device 102 continues to monitor whether the five-finger-press-and-hold input gesture was detected.

If the hand rotation angle is determined to be valid, the method 300 advances to block 310. At block 310, the computing device 102 determines a present GUI orientation of the display 120 of the computing device 102. In other words, the computing device 102 determines the orientation at which the GUI is presently displayed on the display 120. At block 312, the computing device 102 determines a proposed orientation of the GUI based on the determined hand rotation angle. At block 314, the computing device 102 determines whether the present GUI orientation is equal to the proposed GUI orientation. If not, the method 300 advances to block 316, wherein the computing device 102 provides an indication to the display 120 to change the presently displayed GUI orientation to the proposed GUI orientation before looping back to block 302 to determine whether a five-finger-press-and-hold input gesture was detected.

Figure 4:
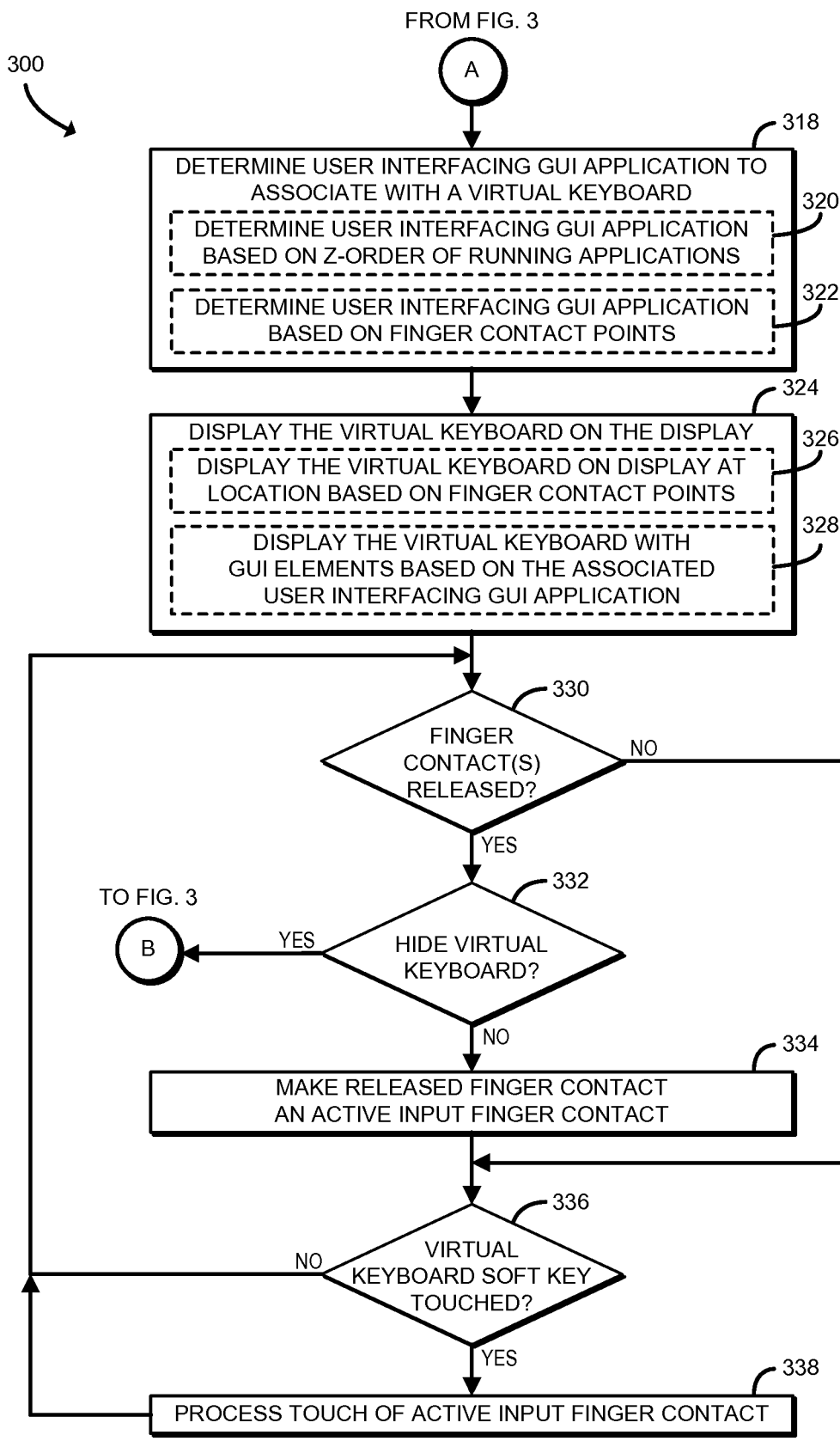
FIG. 4 is a simplified flow diagram of at least one embodiment of a method for displaying a virtual keyboard on a display of the computing device of FIG. 2 during a multi-finger touch interaction that may be executed by the computing device of FIG. 2.

If the computing device 102 determines the present GUI orientation is equal to the proposed GUI orientation at block 314, the computing device 102 advances to block 318, which is shown in FIG. 4. At block 318, the computing device 102 determines a user interfacing GUI application presently being executed on the computing device 102 to associate with a virtual keyboard. In some embodiments, at block 320, the computing device 102 may determine the user interfacing GUI application based on a z-order of applications presently running on the computing device 102. For example, the computing device 102 may determine a topmost GUI of an application whose z-order along a z-axis indicates that that application is in the foreground (i.e., on top, above, in front of, etc.) all the other GUIs of the other presently running applications. Additionally or alternatively, in some embodiments, at block 322, the computing device 102 may determine the user interfacing GUI application based on the finger contact points. For example, the computing device 102 may use the finger contact points to determine a proximate relationship between the finger contact points and each GUI of the presently running applications resides. For example, the computing device may determine which GUI of the presently running applications resides generally underneath the finger contact points, such as by determining which GUI a majority of the finger contact points are in contact with, or hovering over, depending on the z-order of the underlying GUI.

At block 324, the computing device 102 displays the virtual keyboard on the display 120. In some embodiments, at block 326, the computing device 102 displays the virtual keyboard on the display 120 at a location based on the finger contact points. For example, in some embodiments, the virtual keyboard may be located on the display directly under, or slightly above, the finger contact points. Additionally, in some embodiments, other configuration attributes of the virtual keyboard, such as size, display orientation angle, and/or shape, may also be based on the finger contact points. In some embodiments, at block 328, the computing device 102 displays the virtual keyboard on the display based on the user interfacing GUI application determined at block 318.

At block 330, the computing device 102 determines whether one or more previously contacting finger contact points were release. In other words, the computing device 102 determines whether any of the five-finger-press-and-hold input gesture initiating contact points were released. If the computing device 102 determines at block 330 that a previously contacting finger contact point was not released, the method 300 branches to block 336, which is described further below. If the computing device 102 determines that a previously contacting finger contact point was released, the method advances to block 332. At block 332, the computing device 102 determines whether to hide the virtual keyboard. For example, in some embodiments, the computing device 102 may determine to hide the virtual keyboard if the virtual keyboard has not received a user input for a predetermined period of time and/or if all five finger contact points have been released (i.e., all five finger contact points are no longer in contact with touch screen 122 of the display 120).

If the computing device 102 determines the virtual keyboard is to be hidden, the computing device 102 hides the virtual keyboard. The method 300 subsequently loops back to block 302 in which the computing device 102 determines whether a five-finger-press-and-hold input gesture was detected, as discussed above. If the virtual keyboard is not hidden, the method 300 advances to block 334, wherein the previously contacting finger contact point is marked as an input contact before the method 300 advances to block 336. In other words, the user 104 can now use the finger associated with that finger contact point as an input to select soft keys of the virtual keyboard. At block 336, the computing device 102 determines whether an active input finger contact touched the touch screen 122 of the display 120 at a location corresponding to a soft key of the virtual keyboard. In other words, the computing device 102 determines whether an input tap on a soft key of the virtual keyboard from a finger whose contact has been activated as an input to select soft keys of the virtual keyboard.

If the computing device 102 determines a soft key of the virtual keyboard was not touched by an active input finger contact, the method 300 loops back to block 330 to determine whether a finger contact was released. If the computing device 102 determines a soft key of the virtual keyboard was touched by an active input finger contact, the method 300 advances to block 338. At block 338, the computing device 102 processes the touch of the active input finger contact based on the corresponding soft key of the virtual keyboard touched by the active input finger contact before looping back to block 330 to determine whether a finger contact was released.

Figure 8:
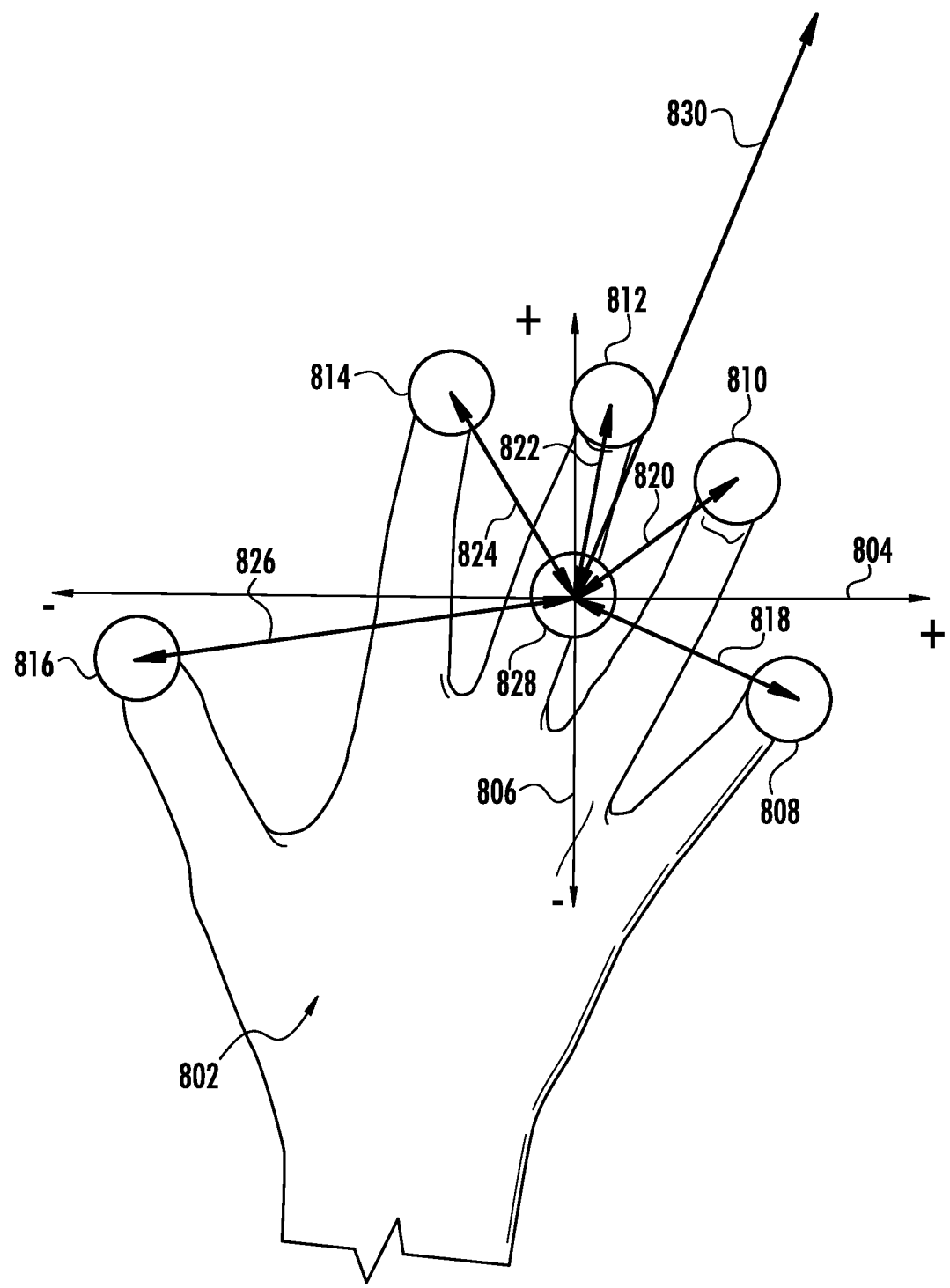
FIG. 8 is a simplified illustration of a view of at least one embodiment of touch point vectors based on fingertips in contact with a display of the computing device of FIG. 2 used to determine a rotation vector that may be used by the computing device of FIG. 2 to determine a hand rotation angle during a multi-finger touch interaction.

Referring now to FIG. 5, in use, the computing device 102 may execute a method 500 for determining a hand rotation angle during a multi-finger touch interaction with the touch screen 122 of the display 120. In some embodiments, the multi-finger touch interaction may comprise the five-finger touch interaction; however, it should be appreciated that any multi-finger touch interaction from which a hand rotation angle can be determined may be used by the computing device 102. The illustrative method 500 begins at block 502, in which the computing device 102 determines a centroid position based on touch points for each of the five finger contacts. For example, as shown in FIG. 8, a hand 802 includes five fingers may have five touch points (i.e., a touch point for each finger) including a pinky finger touch point 808, a ring finger touch point 810, a middle finger touch point 812, an index finger touch point 814, and a thumb touch point 816. Accordingly, the computing device 102 can determine a centroid 828 based on the five touch points. Further, an x-axis 804 and a y-axis 806 (i.e., a centroidal axes) may be established through the centroid 828 which is oriented based on the five touch points.

Referring again to FIG. 5, at block 504, the computing device 102 calculates a touch point vector for each of the five finger contacts. As shown in FIG. 8, a pinky finger touch point vector 818, a ring finger touch point vector 820, a middle finger touch point vector 822, an index finger touch point vector 824, and a thumb touch point vector 826 are each established from the centroid 828 to each of the respective finger touch points 808, 810, 812, 814, 816. Referring again to FIG. 5, in some embodiments, at block 506, the computing device 102 determines which finger contact is a thumb based on which touch point vector of the touch point vectors 818, 820, 822, 824, 826 is the furthest distance from the centroid. As shown in FIG. 8, the thumb vector 826 is the furthest from the centroid 828 (i.e., the longest), indicating that the thumb touch point 816 corresponds to the thumb.

Referring again to FIG. 5, at block 508, the computing device 102 calculates a rotation vector based on the touch point vectors 818, 820, 822, 824, 826. To do so, in block 510, the computing device 102 calculates a sum of the unit touch point vectors (i.e., normalized touch point vectors) using the equation:

$$\sum_{i=0...4} \frac{V_i}{\|V_i\|} \qquad \text{Equation 1}$$

wherein V corresponds to a touch point vector and i corresponds to a touch point vector instance.

In some embodiments, in block 512, the computing device 102 may additionally apply a weight to the rotation vector. To do so, the computing device 102 may calculate a sum of the unit touch point vectors and multiply the thumb vector (e.g., the thumb vector 826 of FIG. 8) by a weight, which results in the following equation:

$$\sum_{i=0...4} \frac{V_i}{\|V_i\|} + \frac{V_j}{\|V_j\|} * w \qquad \text{Equation 2}$$

wherein $V_j$ corresponds to the thumb vector 826, and w corresponds to a weight.

For example, in some embodiments, the weight may be a value between zero and one. In such an embodiment, a weight of zero may push the rotation vector away from the thumb vector, while a weight of one may pull the rotation vector toward the thumb vector. As shown in FIG. 8, a rotation vector 830 has been determined based on the touch point vectors 818, 820, 822, 824, 826 and a weight of 0.3 applied to the thumb vector 826.

At block 514, the computing device 102 determines a hand rotation angle. In some embodiments, the computing device 102 determines the hand rotation angle based on the rotation vector calculated at block 508 relative to the positive x-axis (e.g., x-axis 804 of FIG. 8) established by the touch point vectors (e.g., the touch point vectors 818, 820, 822, 824, 826 of FIG. 8) and intersecting at the centroid (e.g., the centroid 828 of FIG. 8).

Figure 6:
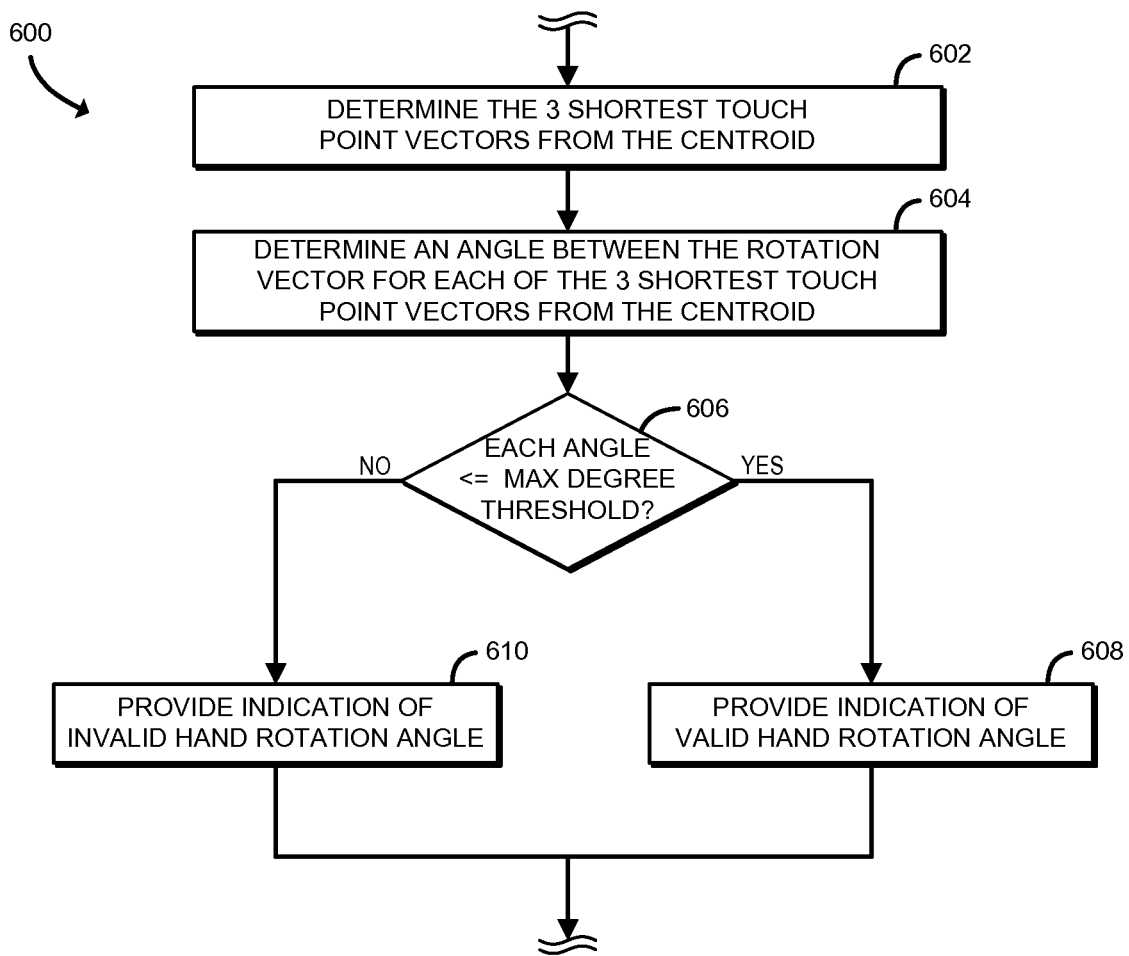
FIG. 6 is a simplified flow diagram of at least one embodiment of a method for validating a hand rotation angle during a multi-finger touch interaction that may be executed by the computing device of FIG. 2.

Referring now to FIG. 6, in use, the computing device 102 may execute a method 600 for validating a hand rotation angle during a multi-finger touch interaction, such as the five-finger-press-and-hold input gesture. The illustrative method 600 begins at block 602, in which the computing device 102 determines the three shortest touch point vectors from the centroid. As shown in FIG. 8, the ring finger touch point 810, the middle finger touch point 812, and the index finger touch point 814 are the three shortest touch point vectors from the centroid 828. Referring again to FIG. 6, at block 604, the computing device 102 determines an angle between the rotation vector and each of the three shortest touch point vectors identified at block 602. At block 606, the computing device 102 determines whether each of the angles between the rotation vector and the three shortest touch point vectors are less than or equal to a maximum angle. For example, in embodiments wherein the display 120 is distinguished by four equally sized quadrants, the maximum angle may be 90°. If the computing device determines that each of the angles between the rotation vector and the three shortest touch point vectors are less than or equal to a maximum angle, the method 600 advances to block 608, wherein the computing device 102 provides an indication of a valid hand rotation angle. If not, the method 600 advances to block 610, wherein the computing device 102 provides an indication of an invalid hand rotation angle.

Figure 7:
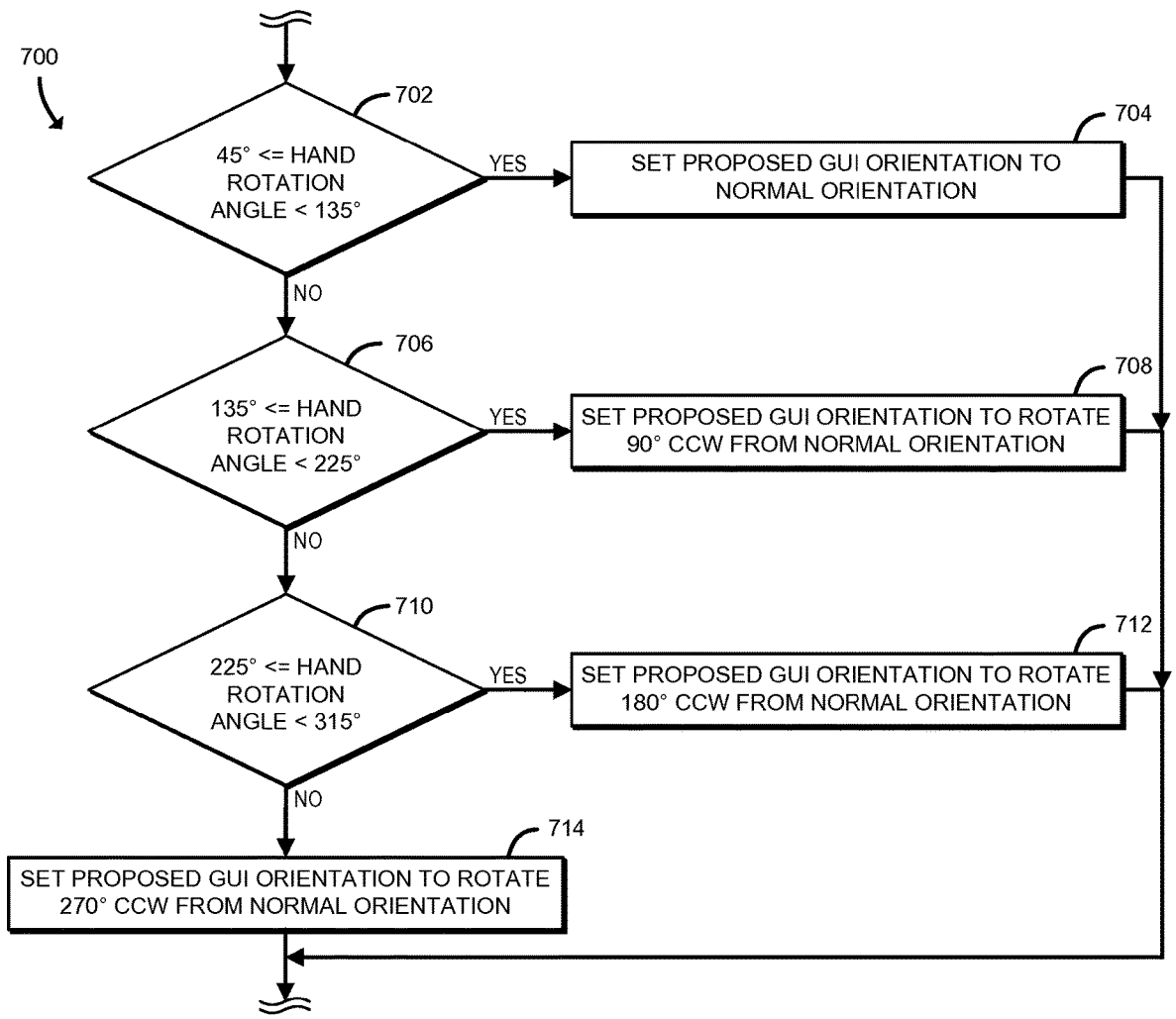
FIG. 7 is a simplified flow diagram of at least one embodiment of a method for determining a proposed GUI orientation of a display of the computing device of FIG. 2 based on a hand rotation angle during a multi-finger touch interaction that may be executed by the computing device of FIG. 2.
Figure 9A:
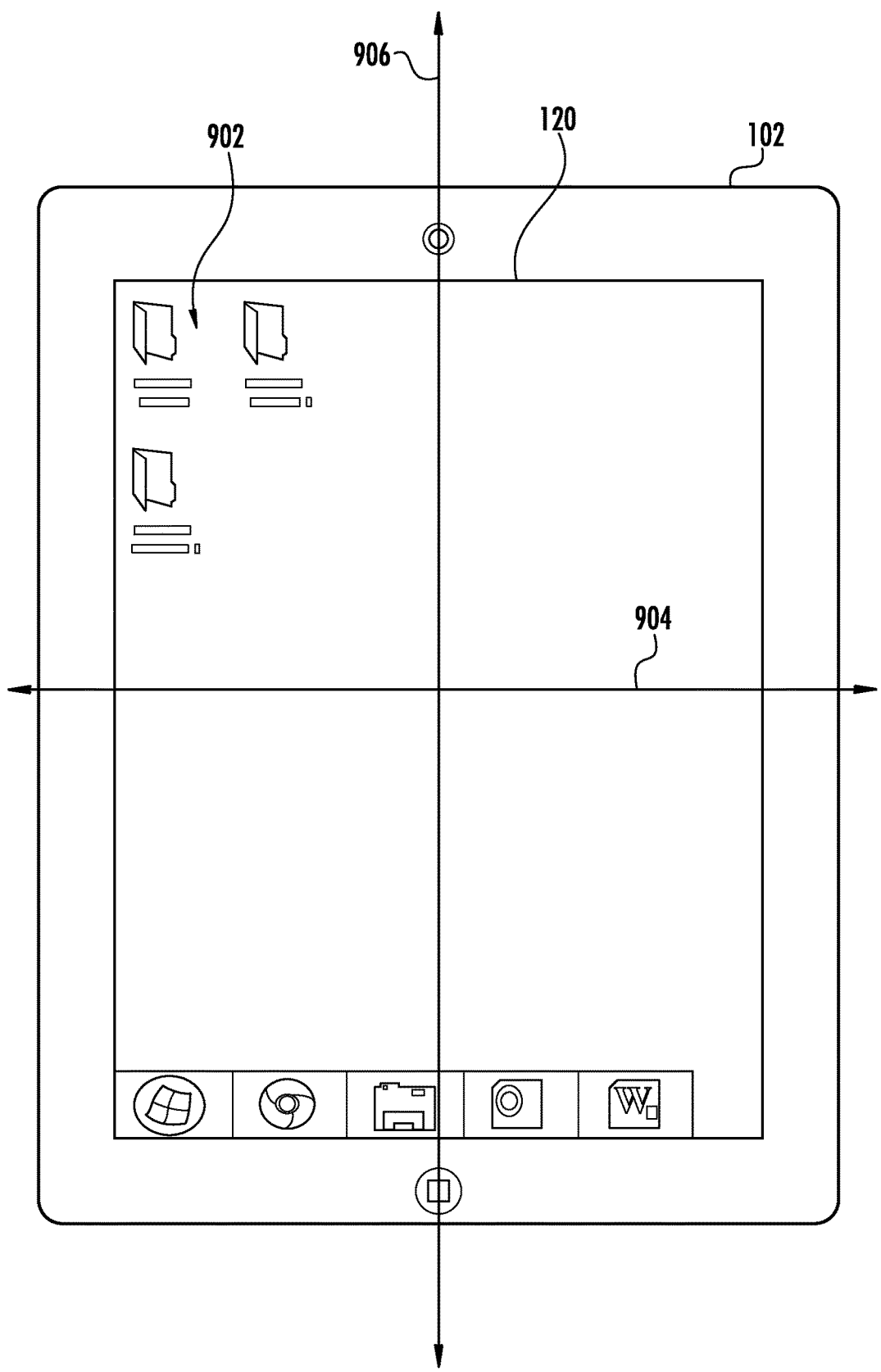
FIGS. 9A-9C are simplified illustrations of an orientation of a display of the computing device of FIG. 2 being adjusted during a multi-finger touch interaction.

Referring now to FIG. 7, in use, the computing device 102 may execute a method 700 for determining a proposed orientation of the GUI on a display (e.g., the display 120) of the computing device 102 based on the hand rotation angle. The illustrative method 700 begins at block 702, in which the computing device 102 determines whether the hand rotation angle is greater than or equal to 45° and less than 135°. If so, the method 700 advances to block 704, wherein the computing device 102 sets the proposed GUI orientation to a normal orientation (i.e., a portrait orientation, as shown in FIG. 9A). If the hand rotation angle is not greater than or equal to 45° and not less than 135°, the method 700 advances to block 706, wherein the computing device 102 determines whether the hand rotation angle is greater than or equal to 135° and less than 225°. If so, the method 700 advances to block 708, wherein the computing device 102 sets the proposed GUI orientation to rotate 90° counterclockwise from normal orientation (i.e., a landscape orientation, as shown in FIG. 9C).

If the hand rotation angle is not greater than or equal to 135° and not less than 225°, the method 700 advances to block 710, wherein the computing device 102 determines whether the hand rotation angle is greater than or equal to 225° and less than 315°. If so, the method 700 advances to block 712, wherein the computing device 102 sets the proposed GUI orientation to rotate 180° counterclockwise from normal orientation (i.e., a flipped portrait orientation). If the hand rotation angle is not greater than or equal to 225° and not less than 315°, the method 700 advances to block

714, the computing device 102 sets the proposed GUI orientation to rotate 270° counterclockwise from normal orientation (i.e., a flipped landscape orientation).

Figure 9B:
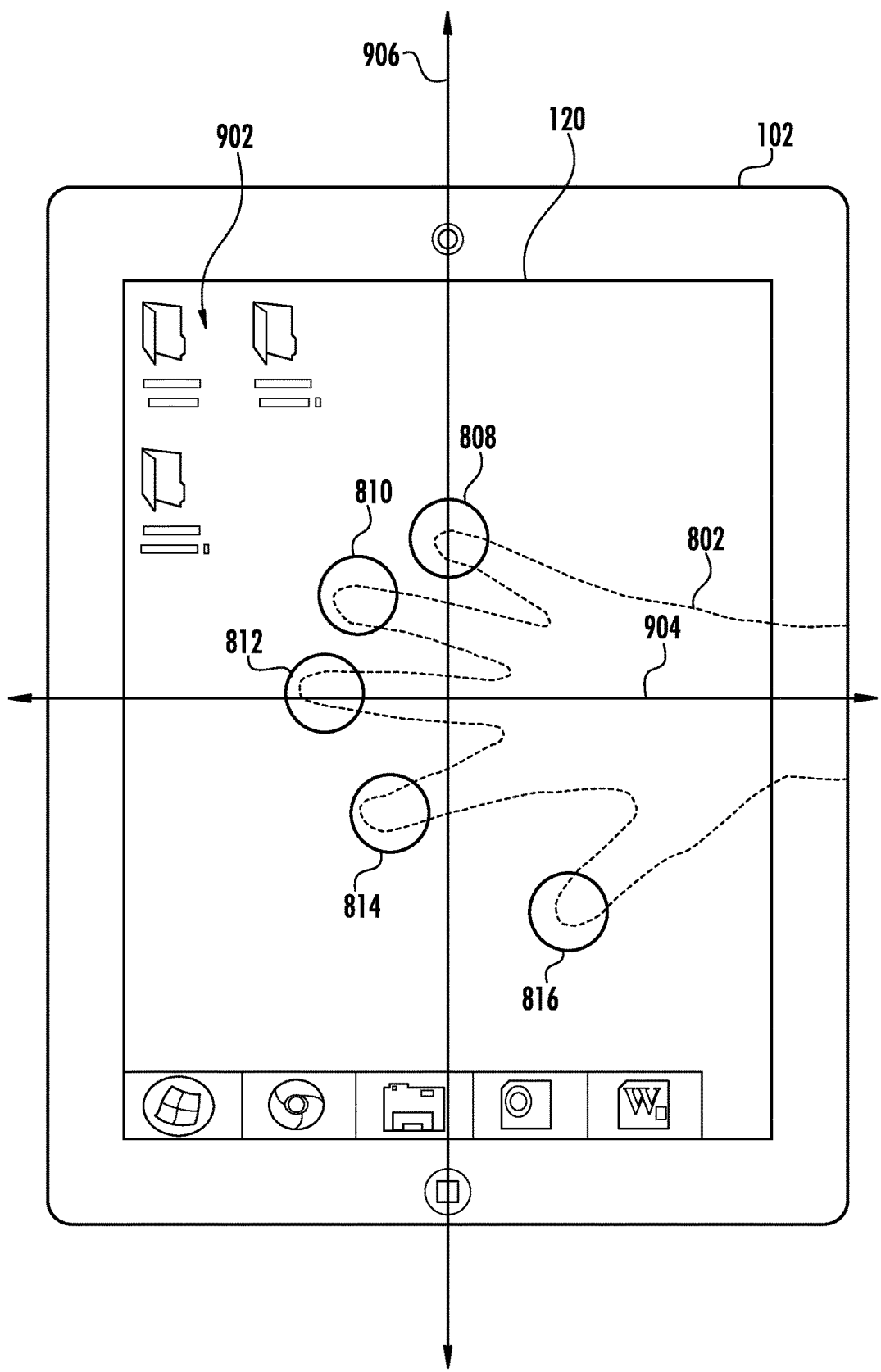
Figure 9C:
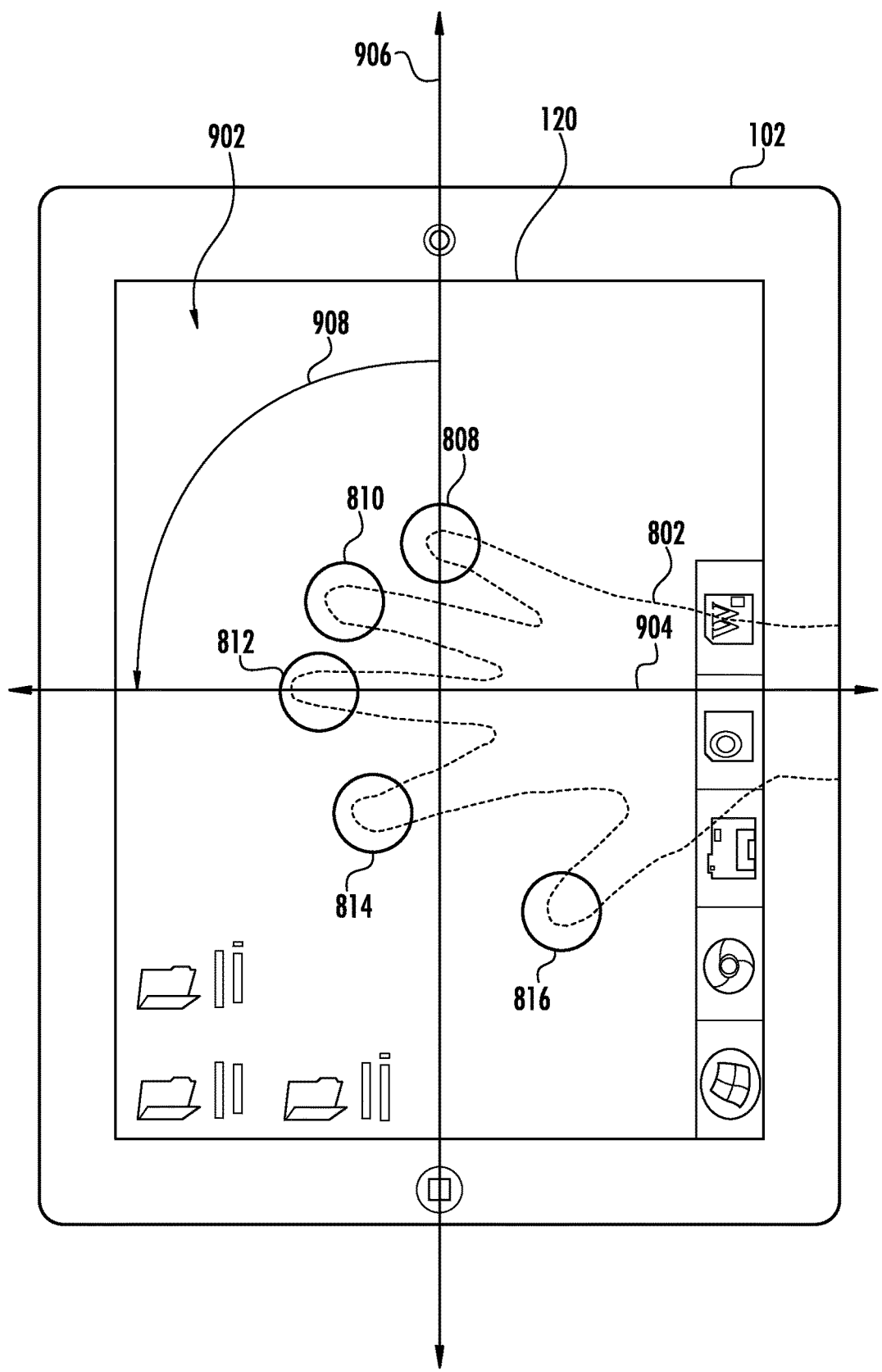

Referring now to FIGS. 9A-9C, a sequence for changing the GUI orientation on the display 120 of the computing device 102 using the five-finger-press-and-hold input gesture is shown. As shown in FIG. 9A, the computing device 102 includes a GUI display 902 at a normal portrait orientation. In other words, the GUI display 902 is displayed in a vertical orientation (i.e., taller along a y-axis 906 than wide along an x-axis 904) and is normal relative to the default viewing orientation of the display 120, typically as compared to physical components or statically positioned soft keys of the computing device 102. It should be appreciated that in some embodiments, the default viewing orientation (i.e., the normal orientation) may be a portrait orientation or a landscape orientation; however, for clarity of the description, the normal orientation is described herein as a portrait orientation. As shown in FIG. 9B, a hand 802 is positioned at a generally 90° angle relative to the touch screen 122 of the display 120. Additionally, each of the five fingers has respective touch points 808, 810, 812, 814, 816 in contact with the touch screen 122. As shown in FIG. 9C, the GUI display 902 is rotated 90° counterclockwise along path 908 based on the position of the hand 802 relative to the touch screen 122. In other words, the GUI display 902 is rotated to a viewing angle relative to the touch points 808, 810, 812, 814, 816 of the hand 802, such that the user 104 does not need to perform any other action (i.e., open display settings, modify orientation settings, etc.) other than the five-finger-press-and-hold input gesture to initiate the rotation of the GUI display 902.

Figure 10A:
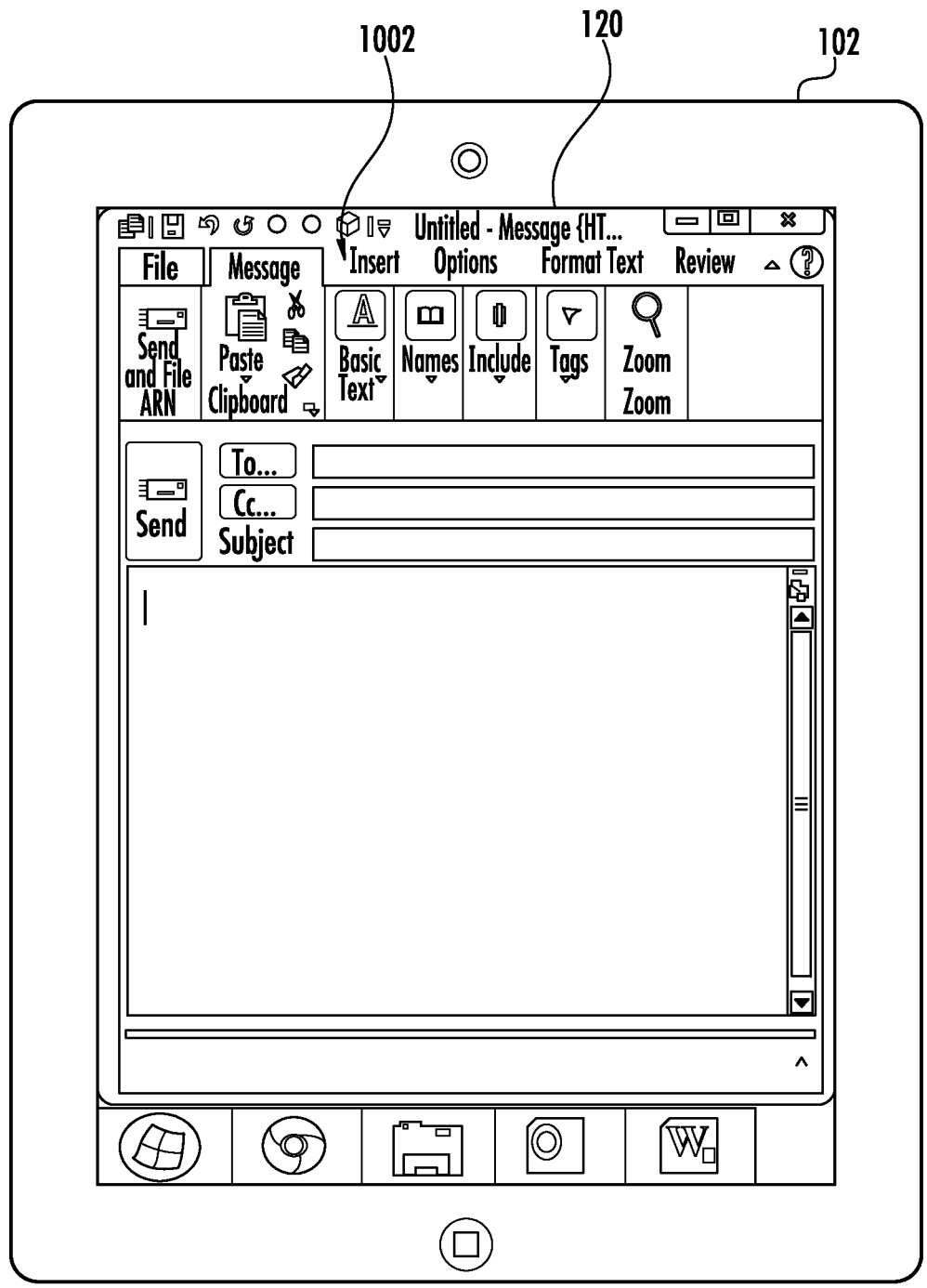
FIGS. 10A-10C are simplified illustrations of a virtual keyboard on a display of the computing device of FIG. 2 being displayed during a multi-finger touch interaction.
Figure 10B:
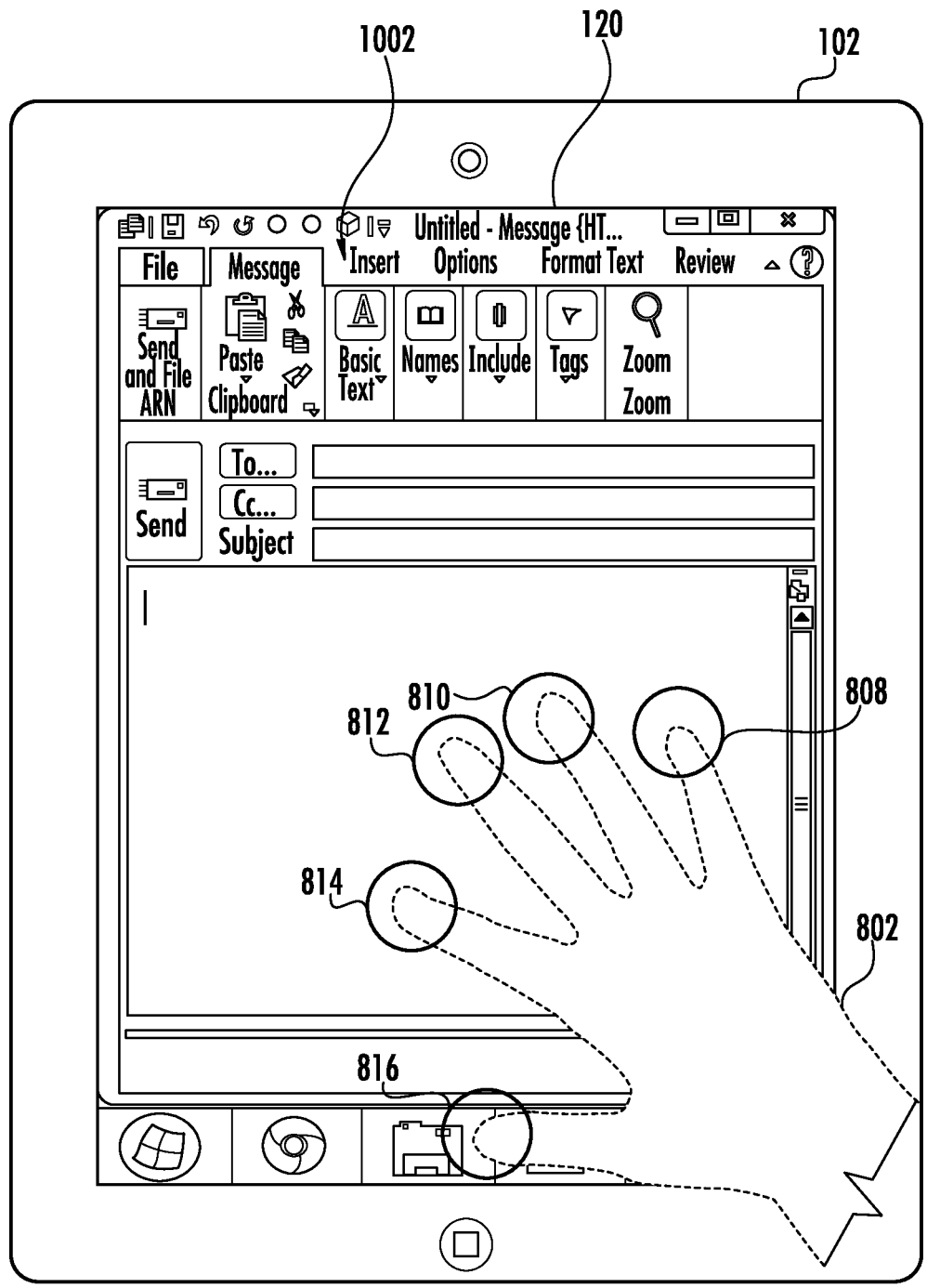
Figure 10C:
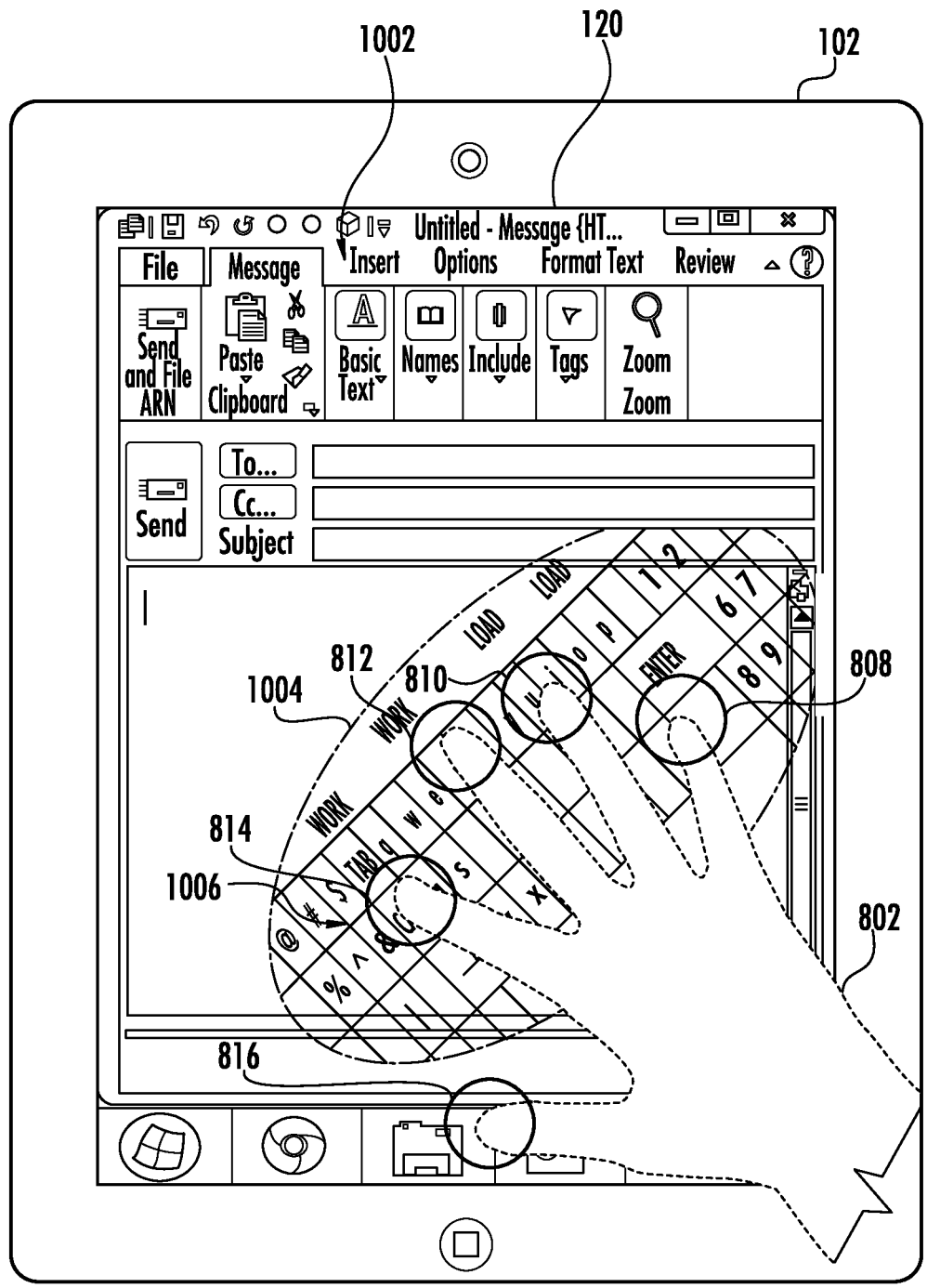

Referring now to FIGS. 10A-10C, a sequence for displaying a virtual keyboard with application context awareness on the display 120 of the computing device 102 using the five-finger-press-and-hold input gesture is shown. As shown in FIG. 10A, an application 1002 running on the computing device 102 includes a text entry GUI. As shown in FIG. 10B, a hand 802 is positioned at a generally 45° angle relative to the touch screen 122 of the display 120. Additionally, each of the five fingers has respective touch points 808, 810, 812, 814, 816 in contact with the touch screen 122. As shown in FIG. 10C, a context-specific virtual keyboard 1004 is displayed with a number of text entry soft keys 1006. As described previously, in use, the computing device 102 detects the five-finger-press-and-hold input gesture, determines a corresponding application (i.e., the application 1002), and determines that the application 1002 requires text entry. Accordingly, the computing device may display the context-specific virtual keyboard 1004 with a number of text entry soft keys 1006 at a size, shape, and location relative to the hand rotation angle determined from the touch points 808, 810, 812, 814, 816 of the hand 802.

Figure 11:
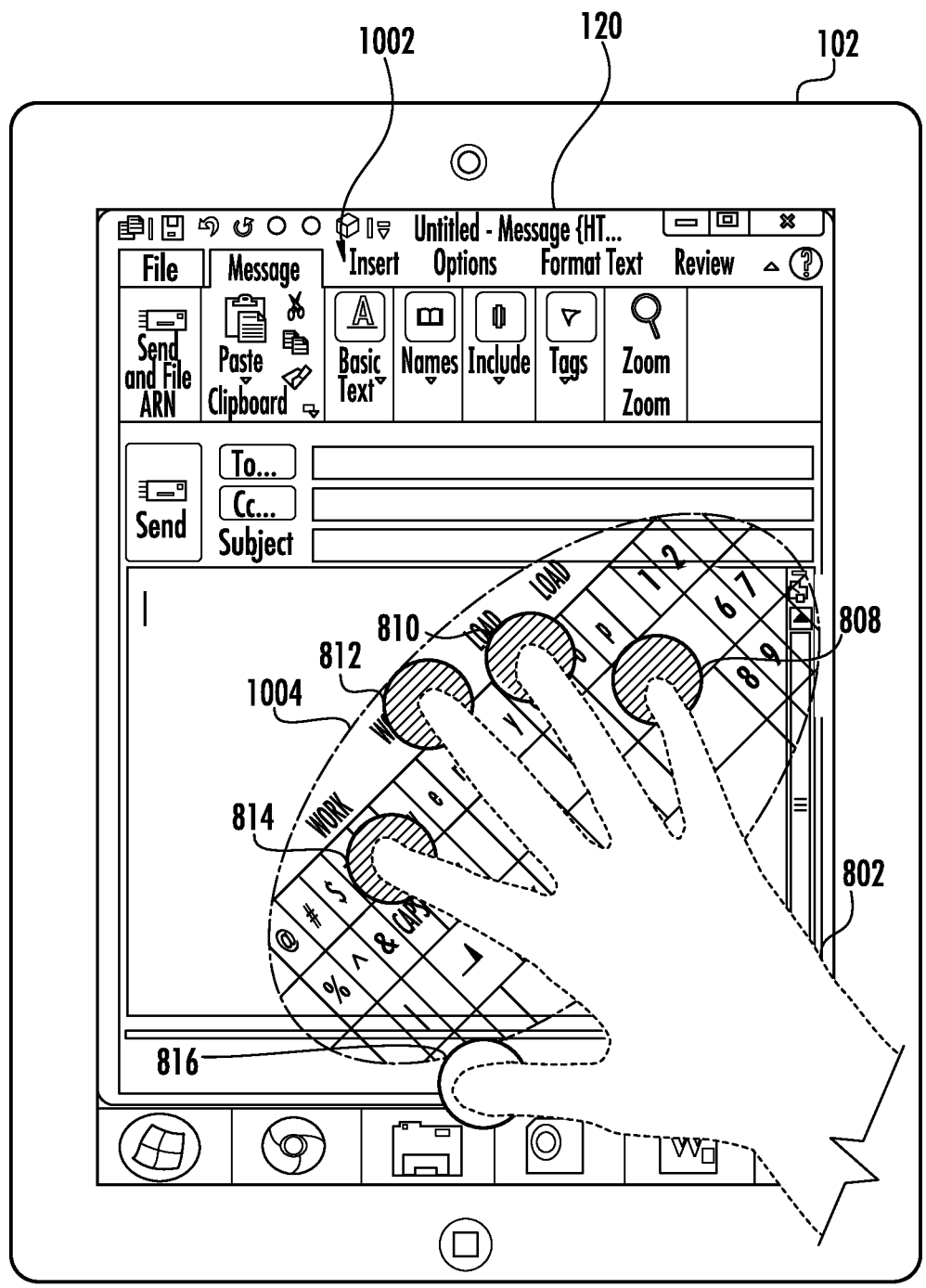
FIG. 11 is a simplified illustration of a context-specific virtual keyboard on a display of the computing device of FIG. 2 having active finger contacts being displayed during a multi-finger touch interaction.

While the virtual keyboard 1004 is shown underlying each of the touch points 808, 810, 812, 814, 816 of the hand 802, it should be appreciated that, in other embodiments, the virtual keyboard may have a different size and/or shape relative to the touch points 808, 810, 812, 814, 816. For example, in some embodiments, the virtual keyboard may be displayed directly below and/or along an arc of the four non-thumb touch points 808, 810, 812, 814 (i.e., no portion of the virtual keyboard underlying the thumb touch point 816). Accordingly, in such embodiments, the user 104 may maintain contact between the touch screen 122 and the thumb touch point 816, while the four non-thumb touch points 808, 810, 812, 814 may be used as active inputs (i.e., can be released from the touch screen 122 and used as inputs). As such, the user 104 can maintain at least one touch point with the touch screen 122 during input in such embodiments that require at least one touch point be maintained with the touch screen to keep the virtual keyboard displayed. As shown in FIG. 11, the context-specific virtual keyboard 1004 is displayed relative to (e.g., below) the touch points 808, 810, 812, 814, 816 and each of the four non-thumb touch points 808, 810, 812, 814 are active finger contacts. In other words, each of the four non-thumb touch points 808, 810, 812, 814 have been released since the five-finger-press-and-hold input gesture was detected and are not active inputs for the context-specific virtual keyboard 1004.

As shown in FIG. 12, an illustrative alternative embodiment of a context-specific virtual keyboard 1202 is also displayed relative to (e.g., below) the touch points 808, 810, 812, 814, 816 and only the index finger touch point 814 is presently an active finger contact. In other words, only the index finger touch point 814 has been released since the five-finger-press-and-hold input gesture was detected and are not active inputs for the context-specific virtual keyboard 1202. Unlike the context-specific virtual keyboard 1004 of FIGS. 10C and 11, which provided a text entry layout of soft keys 1006, an alternative embodiment of the context-specific virtual keyboard 1202 may include a number of predefined spaces allocated for soft keys 1204 that may be assigned to various functions upon selection by the user 104 interfacing with the context-specific virtual keyboard 1202. In some embodiments, the various functions mapped to the default keys may include default, user 104 defined, and/or application defined functions, which may be based on the type of application or specific interfacing with the context-specific virtual keyboard 1202. For example, in some embodiments, one or more of the functions assigned, or mapped, to the soft keys of the context-specific virtual keyboard 1202 may be user-specified via settings of the context-specific virtual keyboard 1202.

An illustrative a mapping table 1300 is shown in FIG. 13 that includes various applications 1302 that may be executed on the computing device 102 and a number of default soft keys 1304 that may be associated with functions (i.e., mapped to the default soft keys 1304) of the various applications 1302. In the illustrative mapping table 1300, a video chat application may be mapped to default soft keys 1304 to be displayed by default on the context-specific virtual keyboard 1202. The default soft keys 1304 for the video chat application may include soft keys mapped to functions supported by the video chat application, such as a full screen toggle soft key, a volume control soft key, a background segmentation soft key, a drop call soft key, an initiate call soft key, and/or an add friends soft key, for example. Of course, it should be appreciated that additional and/or alternative default soft keys 1304 may be mapped to additional and/or alternative applications 1302.

Examples

Illustrative examples of the technologies disclosed herein are provided below. An embodiment of the technologies may include any one or more, and any combination of, the examples described below.

Example 1 includes a computing device to manipulate a graphical user interface (GUI) of a display of the computing device, the computing device comprising a display that includes a touch screen to receive input from a user based on physical contact of one or more fingers of the user with the touch screen, wherein each physical contact between a finger of the user and the touch screen establishes a corresponding touch point; an input gesture determination module to detect a presence of five touch points on the touch screen and determine a five-finger-press-and-hold input gesture received from the user in response to a determination that each of the five touch points is established for a duration that exceeds a predetermined duration; a hand orientation determination module to determine a hand rotation angle based on the detected five touch points; and a GUI orientation management module to (i) determine a present orientation of the GUI, (ii) determine a proposed orientation of the GUI based on the hand rotation angle, and (iii) cause a rotation of an orientation of the GUI on the display in response to a determination that that the proposed orientation and the present orientation of the GUI do not match.

Example 2 includes the subject matter of Example 1, and further including a virtual keyboard display management module to (i) determine, from a number of software applications presently running on the computing device, a software application that corresponds to the five-finger-press-and-hold input gesture and (ii) display a context-specific virtual keyboard at a location based on the five touch points, wherein the context-specific virtual keyboard includes a plurality of soft keys mapped to functions related to the determined software application.

Example 3 includes the subject matter of any of Examples 1 and 2, and wherein to determine the software application that corresponds to the five-finger-press-and-hold input gesture comprises to determine the software application based on a z-order of a GUI of each of the presently running software applications.

Example 4 includes the subject matter of any of Examples 1-3, and wherein to determine the application that corresponds to the five-finger-press-and-hold input gesture comprises to determine the application based on a proximate relationship of a GUI of each of the presently running software applications to the five touch points.

Example 5 includes the subject matter of any of Examples 1-4, and wherein the GUI orientation management module is further to (i) determine at least one of a size, a shape, and a location of the context-specific virtual keyboard based on at least a portion of the five touch points and (ii) determine one or more soft keys of the context-specific virtual keyboard mapped to one or more functions of the determined application.

Example 6 includes the subject matter of any of Examples 1-5, and wherein to determine the hand rotation angle comprises to (i) determine a centroid based on the five touch points, (ii) determine a touch point vector for each of the five touch points based on the determined centroid and each corresponding touch point, (iii) calculate a rotation vector based on the five touch point vectors, and (iv) determine the hand rotation angle based on the rotation vector.

Example 7 includes the subject matter of any of Examples 1-6, and wherein to determine the touch point vector for each of the five touch points comprises to determine a vector from the centroid to a touch point for each of the five touch points.

Example 8 includes the subject matter of any of Examples 1-7, and wherein to calculate the rotation vector comprises to (i) normalize each of the five touch point vectors and (ii) calculate a sum of the five normalized touch point vectors.

Example 9 includes the subject matter of any of Examples 1-8, and wherein to calculate the rotation vector further comprises to (i) determine a furthest touch point based on which touch point of the five touch point vectors is furthest from the centroid and (ii) determine the rotation vector further based on a weight applied to furthest touch point.

Example 10 includes the subject matter of any of Examples 1-9, and wherein to determine the hand rotation angle based on the rotation vector comprises to determine the hand rotation angle based on the rotation vector relative to a positive x-axis through the centroid.

Example 11 includes the subject matter of any of Examples 1-10, and wherein the hand orientation determination module is further to validate the hand rotation angle.

Example 12 includes the subject matter of any of Examples 1-11, and wherein to validate the hand rotation angle comprises to (i) determine a centroid based on the five touch points, (ii) determine a touch point vector for each of the five touch points based on the determined centroid and each corresponding touch point, (iii) determine three touch point vectors of the five touch point vectors that are closest to the centroid, (iv) determine an angle between each of the three touch point vectors and an axis of a centroidal axes through the centroid, and (iv) determine a confidence level of the hand rotation angle based on each angle being less than a maximum angle.

Example 13 includes the subject matter of any of Examples 1-12, and wherein the maximum angle is equal to 90°.

Example 14 includes the subject matter of any of Examples 1-13, and wherein to determine the proposed orientation of the GUI based on the hand rotation angle comprises to determine a proposed GUI rotation angle relative to a normal orientation of the display.

Example 15 includes the subject matter of any of Examples 1-14, and wherein to cause the rotation of the orientation of the GUI on the display comprises to cause the rotation of the orientation of the GUI to rotate the GUI to the normal orientation of the display in response to a determination that the hand rotation angle is greater than or equal to 45° and less than 135°.

Example 16 includes the subject matter of any of Examples 1-15, and wherein to cause the rotation of the orientation of the GUI on the display comprises to cause the rotation of the orientation of the GUI to rotate the GUI to the normal orientation of the display in response to a determination that the hand rotation angle is greater than or equal to 135° and less than 225°.

Example 17 includes the subject matter of any of Examples 1-16, and wherein to cause the rotation of the orientation of the GUI on the display comprises to cause the rotation of the orientation of the GUI to rotate the GUI to the normal orientation of the display in response to a determination that the hand rotation angle is greater than or equal to 225° and less than 315°.

Example 18 includes the subject matter of any of Examples 1-17, and wherein to cause the rotation of the orientation of the GUI on the display comprises to cause the rotation of the orientation of the GUI to rotate the GUI to the normal orientation of the display in response to a determination that the hand rotation angle is greater than or equal to 315°.

Example 19 includes a method for manipulating a graphical user interface (GUI) of a display of the computing device, the method comprising detecting a presence of five touch points on a touch screen of a display of the computing device, wherein each of the five touch points is indicative of a physical contact of a finger of a user of the computing with the touch screen; determining a five-finger-press-and-hold input gesture received from the user in response to a determination that the presence of each of the five touch points is established for a duration that exceeds a predetermined duration; determining a hand rotation angle based on the detected five touch points; determining a present orientation of the GUI; determining a proposed orientation of the GUI based on the hand rotation angle; and causing a rotation of an orientation of the GUI on the display in response to a determination that that the proposed orientation and the present orientation of the GUI do not match.

Example 20 includes the subject matter of Example 19, and further including determining, from a number of software applications presently running on the computing device, a software application that corresponds to the five-finger-press-and-hold input gesture; and displaying a context-specific virtual keyboard at a location based on the five touch points, wherein the context-specific virtual keyboard includes a plurality of soft keys mapped to functions related to the determined software application.

Example 21 includes the subject matter of any of Examples 19 and 20, and wherein determining the software application that corresponds to the five-finger-press-and-hold input gesture comprises determining the software application based on a z-order of a GUI of each of the presently running software applications.

Example 22 includes the subject matter of any of Examples 19-21, and wherein determining the application that corresponds to the five-finger-press-and-hold input gesture comprises determining the application based on a proximate relationship of a GUI of each of the presently running software applications to the five touch points.

Example 23 includes the subject matter of any of Examples 19-22, and further including determining at least one of a size, a shape, and a location of the context-specific virtual keyboard based on at least a portion of the five touch points; and determining one or more soft keys of the context-specific virtual keyboard mapped to one or more functions of the determined application.

Example 24 includes the subject matter of any of Examples 19-23, and wherein determining the hand rotation angle comprises (i) determining a centroid based on the five touch points, (ii) determining a touch point vector for each of the five touch points based on the determined centroid and each corresponding touch point, (iii) calculating a rotation vector based on the five touch point vectors, and (iv) determining the hand rotation angle based on the rotation vector.

Example 25 includes the subject matter of any of Examples 19-24, and wherein determining the touch point vector for each of the five touch points comprises determining a vector from the centroid to a touch point for each of the five touch points.

Example 26 includes the subject matter of any of Examples 19-25, and wherein calculating the rotation vector comprises (i) normalizing each of the five touch point vectors and (ii) calculating a sum of the five normalized touch point vectors.

Example 27 includes the subject matter of any of Examples 19-26, and wherein calculating the rotation vector further comprises (i) determining a furthest touch point based on which touch point of the five touch point vectors is furthest from the centroid and (ii) determining the rotation vector further based on a weight applied to the furthest touch point.

Example 28 includes the subject matter of any of Examples 19-27, and wherein determining the hand rotation angle based on the rotation vector comprises determining the hand rotation angle based on the rotation vector relative to a positive x-axis through the centroid.

Example 29 includes the subject matter of any of Examples 19-28, and further including validating the hand rotation angle.

Example 30 includes the subject matter of any of Examples 19-29, and wherein validating the hand rotation angle comprises (i) determining a centroid based on the five touch points, (ii) determining a touch point vector for each of the five touch points based on the determined centroid and each corresponding touch point, (iii) determining three touch point vectors of the five touch point vectors that are closest to the centroid, (iv) determining an angle between each of the three touch point vectors and an axis of a centroidal axes through the centroid, and (v) determining a confidence level of the hand rotation angle based on each angle being less than a maximum angle.

Example 31 includes the subject matter of any of Examples 19-30, and wherein determining the confidence level of the hand rotation angle based on each angle being less than the maximum angle comprises determining the confidence level of the hand rotation angle based on each angle being less than 90°.

Example 32 includes the subject matter of any of Examples 19-31, and, wherein determining the proposed orientation of the GUI based on the hand rotation angle comprises determining a proposed GUI rotation angle relative to a normal orientation of the display.

Example 33 includes the subject matter of any of Examples 19-32, and wherein causing the rotation of the orientation of the GUI on the display comprises causing the rotation of the orientation of the GUI to rotate the GUI to the normal orientation of the display in response to a determination that the hand rotation angle is greater than or equal to 45° and less than 135°.

Example 34 includes the subject matter of any of Examples 19-33, and wherein causing the rotation of the orientation of the GUI on the display comprises causing the rotation of the orientation of the GUI to rotate the GUI to the normal orientation of the display in response to a determination that the hand rotation angle is greater than or equal to 135° and less than 225°.

Example 35 includes the subject matter of any of Examples 19-34, and wherein causing the rotation of the orientation of the GUI on the display comprises causing the rotation of the orientation of the GUI to rotate the GUI to the normal orientation of the display in response to a determination that the hand rotation angle is greater than or equal to 225° and less than 315°.

Example 36 includes the subject matter of any of Examples 19-35, and wherein causing the rotation of the orientation of the GUI on the display comprises causing the rotation of the orientation of the GUI to rotate the GUI to the normal orientation of the display in response to a determination that the hand rotation angle is greater than or equal to 315°.

Example 37 includes a computing device comprising a processor; and a memory having stored therein a plurality of instructions that when executed by the processor cause the computing device to perform the method of any of Examples 19-36.

Example 38 includes one or more machine readable storage media comprising a plurality of instructions stored thereon that in response to being executed result in a computing device performing the method of any of Examples 19-36.

Example 39 includes a computing device for manipulating a graphical user interface (GUI) of a display of the computing device, the computing device comprising means for detecting a presence of five touch points on a touch screen of a display of the computing device, wherein each of the five touch points is indicative of a physical contact of a finger of a user of the computing with the touch screen; means for determining a five-finger-press-and-hold input gesture received from the user in response to a determination that the presence of each of the five touch points is established for a duration that exceeds a predetermined duration; means for determining a hand rotation angle based on the detected five touch points; means for determining a present orientation of the GUI; means for determining a proposed orientation of the GUI based on the hand rotation angle; and means for causing a rotation of an orientation of the GUI on the display in response to a determination that that the proposed orientation and the present orientation of the GUI do not match.

Example 40 includes the subject matter of Example 39, and further including means for determining, from a number of software applications presently running on the computing device, a software application that corresponds to the five-finger-press-and-hold input gesture; and means for displaying a context-specific virtual keyboard at a location based on the five touch points, wherein the context-specific virtual keyboard includes a plurality of soft keys mapped to functions related to the determined software application.

Example 41 includes the subject matter of any of Examples 39 and 40, and wherein the means for determining the software application that corresponds to the five-finger-press-and-hold input gesture comprises means for determining the software application based on a z-order of a GUI of each of the presently running software applications.

Example 42 includes the subject matter of any of Examples 39-41, and wherein the means for determining the application that corresponds to the five-finger-press-and-hold input gesture comprises means for determining the application based on a proximate relationship of a GUI of each of the presently running software applications to the five touch points.

Example 43 includes the subject matter of any of Examples 39-42, and further including means for determining at least one of a size, a shape, and a location of the context-specific virtual keyboard based on at least a portion of the five touch points; and means for determining one or more soft keys of the context-specific virtual keyboard mapped to one or more functions of the determined application.

Example 44 includes the subject matter of any of Examples 39-43, and wherein the means for determining the hand rotation angle comprises means for (i) determining a centroid based on the five touch points, (ii) determining a touch point vector for each of the five touch points based on the determined centroid and each corresponding touch point, (iii) calculating a rotation vector based on the five touch point vectors, and (iv) determining the hand rotation angle based on the rotation vector.

Example 45 includes the subject matter of any of Examples 39-44, and wherein the means for determining the touch point vector for each of the five touch points comprises means for determining a vector from the centroid to a touch point for each of the five touch points.

Example 46 includes the subject matter of any of Examples 39-45, and wherein the means for calculating the rotation vector comprises means for (i) normalizing each of the five touch point vectors and (ii) calculating a sum of the five normalized touch point vectors.

Example 47 includes the subject matter of any of Examples 39-46, and wherein the means for calculating the rotation vector further comprises means for (i) determining a furthest touch point based on which touch point of the five touch point vectors is furthest from the centroid and (ii) determining the rotation vector further based on a weight applied to the furthest touch point.

Example 48 includes the subject matter of any of Examples 39-47, and, wherein the means for determining the hand rotation angle based on the rotation vector comprises means for determining the hand rotation angle based on the rotation vector relative to a positive x-axis through the centroid.

Example 49 includes the subject matter of any of Examples 39-48, and further including means for validating the hand rotation angle.

Example 50 includes the subject matter of any of Examples 39-49, and wherein the means for validating the hand rotation angle comprises means for (i) determining a centroid based on the five touch points, (ii) determining a touch point vector for each of the five touch points based on the determined centroid and each corresponding touch point, (iii) determining three touch point vectors of the five touch point vectors that are the closest to the centroid, (iv) determining an angle between each of the three touch point vectors and an axis of a centroidal axes through the centroid, and (v) determining a confidence level of the hand rotation angle based on each angle being less than a maximum angle.

Example 51 includes the subject matter of any of Examples 39-50, and wherein means for determining the confidence level of the hand rotation angle based on each angle being less than the maximum angle comprises means for determining the confidence level of the hand rotation angle based on each angle being less than 90°.

Example 52 includes the subject matter of any of Examples 39-51, and wherein the means for determining the proposed orientation of the GUI based on the hand rotation angle comprises means for determining a proposed GUI rotation angle relative to a normal orientation of the display.

Example 53 includes the subject matter of any of Examples 39-52, and wherein the means for causing the rotation of orientation of the GUI to rotate the GUI to the normal orientation of the display in response to a determination that the hand rotation angle is greater than or equal to 45° and less than 135°.

Example 54 includes the subject matter of any of Examples 39-53, and wherein the means for causing the rotation of the orientation of the GUI on the display comprises means for causing the rotation of the orientation of the GUI to rotate the GUI to the normal orientation of the display in response to a determination that the hand rotation angle is greater than or equal to 135° and less than 225°.

Example 55 includes the subject matter of any of Examples 39-54, and wherein the means for causing the rotation of the orientation of the GUI on the display comprises means for causing the rotation of the orientation of the GUI to rotate the GUI to the normal orientation of the display in response to a determination that the hand rotation angle is greater than or equal to 225° and less than 315°.

Example 56 includes the subject matter of any of Examples 39-55, and wherein the means for causing the rotation of the orientation of the GUI on the display comprises means for causing the rotation of the orientation of the GUI to rotate the GUI to the normal orientation of the display in response to a determination that the hand rotation angle is greater than or equal to 315°.

The invention claimed is:

1. A computing device to manipulate a graphical user interface (GUI) of a display of the computing device, the computing device comprising:
the display that includes a touch screen to receive input from a user based on physical contact of one or more fingers of the user with the touch screen, wherein each physical contact between a finger of the user and the touch screen establishes a corresponding touch point;
an input gesture determination circuitry configured to detect a presence of five touch points on the touch screen and determine a five-finger-press-and-hold input gesture received from the user in response to a determination that each of the five touch points is established for a duration that exceeds a predetermined duration;
a hand orientation determination circuitry configured to determine a hand rotation angle based on the detected five touch points and a weight independently applied to a farthest touch point of the five touch points;
a GUI orientation management circuitry configured to (i) determine a present orientation of a GUI element, (ii) determine a proposed orientation of the GUI element based on the hand rotation angle, and (iii) cause a rotation of the GUI element on the display in response to a determination that the proposed orientation and the present orientation of the GUI element do not match; and
a virtual keyboard display management circuitry configured to (i) determine, from a number of software applications presently running on the computing device, a software application that corresponds to the five-finger-press-and-hold input gesture, wherein to determine the software application that corresponds to the five-finger-press-and-hold input gesture comprises to determine the software application based on which of the software applications presently running has a software application GUI in which a majority of the five touch points are at least one of in contact with or hovering over the software application GUI, and (ii) display a context-specific virtual keyboard, in addition to the GUI element, that includes a plurality of soft keys mapped to functions related to the determined software application at a location based on the five touch points.

2. The computing device of claim 1, wherein to determine the hand rotation angle comprises to (i) determine a centroid based on the five touch points, (ii) determine a touch point vector for each of the five touch points based on the determined centroid and each corresponding touch point, (iii) calculate a rotation vector based on the five touch point vectors, and (iv) determine the hand rotation angle based on the rotation vector relative to a positive x-axis through the centroid.

3. The computing device of claim 2, wherein to calculate the rotation vector comprises to (i) normalize each of the five touch point vectors, (ii) calculate a sum of the five normalized touch point vectors, (iii) determine the farthest touch point based on which touch point of the five touch point vectors is farthest from the centroid, and (iv) determine the rotation vector further based on the weight applied to the farthest touch point.

4. The computing device of claim 1, wherein the hand orientation determination circuitry is further configured to validate the hand rotation angle, wherein to validate the hand rotation angle comprises to (i) determine a centroid based on the five touch points, (ii) determine a touch point vector for each of the five touch points based on the determined centroid and each corresponding touch point, (iii) determine three touch point vectors of the five touch point vectors that are closest to the centroid, (iv) determine an angle between each of the three touch point vectors and an axis of a centroidal axes through the centroid, and (v) determine a confidence level of the hand rotation angle based on each angle being less than a maximum angle.

5. The computing device of claim 1, wherein to determine the proposed orientation of the GUI element based on the hand rotation angle comprises to determine a proposed GUI rotation angle relative to a normal orientation of the display.

6. The computing device of claim 5, wherein to cause the rotation of the orientation of the GUI element on the display comprises to cause the rotation of the orientation of the GUI element to rotate the GUI element to the proposed GUI rotation angle in response to a determination that the hand rotation angle is greater than or equal to 45° and less than 135°,
wherein to cause the rotation of the orientation of the GUI element on the display comprises to cause the rotation of the orientation of the GUI element to rotate the GUI element to the proposed GUI rotation angle in response to a determination that the hand rotation angle is greater than or equal to 135° and less than 225°,
wherein to cause the rotation of the orientation of the GUI element on the display comprises to cause the rotation of the orientation of the GUI element to rotate the GUI element to the proposed GUI rotation angle in response to a determination that the hand rotation angle is greater than or equal to 225° and less than 315° , and
wherein to cause the rotation of the orientation of the GUI element on the display comprises to cause the rotation of the orientation of the GUI element to rotate the GUI element to the proposed GUI rotation angle in response to a determination that the hand rotation angle is greater than or equal to 315°.

7. One or more non-transitory, computer-readable storage media comprising a plurality of instructions that in response to being executed cause a computing device to:
detect a presence of five touch points on a touch screen of a display of the computing device, wherein each of the five touch points is indicative of a physical contact of a finger of a user of the computing with the touch screen;
determine a five-finger-press-and-hold input gesture received from the user in response to a determination that the presence of each of the five touch points is established for a duration that exceeds a predetermined duration;
determine a hand rotation angle based on the detected five touch points and a weight independently applied to a farthest touch point of the five touch points;
determine a present orientation of a GUI element;
determine a proposed orientation of the GUI element based on the hand rotation angle;
cause a rotation of the GUI element on the display in response to a determination that that the proposed orientation and the present orientation of the GUI element do not match;
determine, from a number of software applications presently running on the computing device, a software application that corresponds to the five-finger-press-and-hold input gesture, wherein to determine the software application that corresponds to the five-finger-press-and-hold input gesture comprises to determine the software application based on which of the software applications presently running has a software application GUI in which a majority of the five touch points are at least one of in contact with or hovering over the software application GUI; and display a context-specific virtual keyboard, in addition to the GUI element, that includes a plurality of soft keys mapped to functions related to the determined software application at a location based on the five touch points.

8. The one or more non-transitory, computer-readable storage media of claim 7, wherein determining the hand rotation angle comprises (i) determining a centroid based on the five touch points, (ii) determining a touch point vector for each of the five touch points based on the determined centroid and each corresponding touch point, (iii) calculating a rotation vector based on the five touch point vectors, and (iv) determining the hand rotation angle based on the rotation vector relative to a positive x-axis through the centroid.

9. The one or more non-transitory, computer-readable storage media of claim 8, wherein calculating the rotation vector comprises (i) normalizing each of the five touch point vectors, (ii) calculating a sum of the five normalized touch point vectors, (iii) determining the farthest touch point based on which touch point of the five touch point vectors is farthest from the centroid and (iv) determining the rotation vector further based on the weight applied to the farthest touch point.

10. The one or more non-transitory, computer-readable storage media of claim 7, further comprising a plurality of instructions that in response to being executed cause the computing device to:
validate the hand rotation angle, wherein validating the hand rotation angle comprises (i) determining a centroid based on the five touch points;
determine a touch point vector for each of the five touch points based on the determined centroid and each corresponding touch point
determine three touch point vectors of the five touch point vectors that are closest to the centroid
determine an angle between each of the three touch point vectors and an axis of a centroidal axes through the centroid, and
determine a confidence level of the hand rotation angle based on each angle being less than a maximum angle.

11. The one or more non-transitory, computer-readable storage media of claim 7, wherein to cause the rotation of the orientation of the GUI element on the display comprises to cause the rotation of the orientation of the GUI element to rotate the GUI element to the proposed GUI rotation angle in response to a determination that the hand rotation angle is greater than or equal to 45° and less than 135°,
wherein to cause the rotation of the orientation of the GUI element on the display comprises to cause the rotation of the orientation of the GUI element to rotate the GUI element to the proposed GUI rotation angle in response to a determination that the hand rotation angle is greater than or equal to 135° and less than 225°,
wherein to cause the rotation of the orientation of the GUI element on the display comprises causing the rotation of the orientation of the GUI element to rotate the GUI element to the proposed GUI rotation angle in response to a determination that the hand rotation angle is greater than or equal to 225° and less than 315°, and
wherein to cause the rotation of the orientation of the GUI element on the display comprises to cause the rotation of the orientation of the GUI element to rotate the GUI element to the proposed GUI rotation angle in response to a determination that the hand rotation angle is greater than or equal to 315°.

12. A method for manipulating a graphical user interface (GUI) of a display of the computing device, the method comprising:
detecting a presence of five touch points on a touch screen of the display of the computing device, wherein each of the five touch points is indicative of a physical contact of a finger of a user of the computing device with the touch screen;
determining a five-finger-press-and-hold input gesture received from the user in response to a determination that the presence of each of the five touch points is established for a duration that exceeds a predetermined duration;
determining a hand rotation angle based on the detected five touch points and a weight applied independently to a farthest touch point of the five touch points;
determining a present orientation of a GUI element;
determining a proposed orientation of the GUI element based on the hand rotation angle;
causing a rotation of the GUI element on the display in response to a determination that that the proposed orientation and the present orientation of the GUI element do not match;
determining, from a number of software applications presently running on the computing device, a software application that corresponds to the five-finger-press-and-hold input gesture, wherein determining the software application that corresponds to the five-finger-press-and-hold input gesture comprises to determine the software application based on which of the software applications presently running has a software application GUI in which a majority of the five touch points are at least one of in contact with or hovering over the software application GUI; and
displaying a context-specific virtual keyboard, in addition to the GUI element, that includes a plurality of soft keys mapped to functions related to the determined software application at a location based on the five touch points.

13. The method of claim 12, wherein determining the hand rotation angle comprises (i) determining a centroid based on the five touch points, (ii) determining a touch point vector for each of the five touch points based on the determined centroid and each corresponding touch point, (iii) calculating a rotation vector based on the five touch point vectors, and (iv) determining the hand rotation angle based on the rotation vector relative to a positive x-axis through the centroid.

14. The method of claim 13, wherein calculating the rotation vector comprises (i) normalizing each of the five touch point vectors, (ii) calculating a sum of the five normalized touch point vectors, (iii) determining the farthest touch point based on which touch point of the five touch point vectors is farthest from the centroid, and (iv) determining the rotation vector further based on the weight applied to the farthest touch point.

15. The method of claim 12, further comprising validating the hand rotation angle, wherein validating the hand rotation angle comprises (i) determining a centroid based on the five touch points, (ii) determining a touch point vector for each of the five touch points based on the determined centroid and each corresponding touch point, (iii) determining three touch point vectors of the five touch point vectors that are closest to the centroid, (iv) determining an angle between each of the three touch point vectors and an axis of a centroidal axes through the centroid, and (v) determining a confidence level of the hand rotation angle based on each angle being less than a maximum angle.

16. The method of claim 12, wherein causing the rotation of the orientation of the GUI element on the display comprises causing the rotation of the orientation of the GUI element to rotate the GUI element to the proposed GUI rotation angle in response to a determination that the hand rotation angle is greater than or equal to 45° and less than 135°,
- wherein causing the rotation of the orientation of the GUI element on the display comprises causing the rotation of the orientation of the GUI element to rotate the GUI element to the proposed GUI rotation angle in response to a determination that the hand rotation angle is greater than or equal to 135° and less than 225°,
- wherein causing the rotation of the orientation of the GUI element on the display comprises causing the rotation of the orientation of the GUI element to rotate the GUI element to the proposed GUI rotation angle in response to a determination that the hand rotation angle is greater than or equal to 225° and less than 315°, and
- wherein causing the rotation of the orientation of the GUI element on the display comprises causing the rotation of the orientation of the GUI element to rotate the GUI element to the proposed GUI rotation angle in response to a determination that the hand rotation angle is greater than or equal to 315°.

\* \* \* \* \*